United States Patent
Helpenstein et al.

(10) Patent No.: US 11,281,191 B2
(45) Date of Patent: Mar. 22, 2022

(54) GLOBAL E-STOP IN AN INDUSTRIAL SAFETY SYSTEM WITH LOCAL AND GLOBAL SAFETY INPUT DEVICES

(71) Applicant: Rockwell Automation Germany GmbH & Co. KG, Wuppertal (DE)

(72) Inventors: Thomas Helpenstein, Wuppertal (DE); Mussa Tohidi Khaniki, Wuppertal (DE); Rudolf Papenbreer, Wuppertal (DE); Oliver Heckel, Wuppertal (DE); Jan Anslinger, Wuppertal (DE); Suresh R. Nair, Amherst, NH (US); Norbert Machuletz, Wuppertal (DE)

(73) Assignee: Rockwell Automation Germany GmbH & Co. KG, Wuppertal (DE)

( * ) Notice: Subject to any disclaimer, the term of this patent is extended or adjusted under 35 U.S.C. 154(b) by 48 days.

(21) Appl. No.: 16/861,844

(22) Filed: Apr. 29, 2020

(65) Prior Publication Data
US 2021/0341906 A1 Nov. 4, 2021

(51) Int. Cl.
*G05B 19/418* (2006.01)
*G05B 9/03* (2006.01)

(52) U.S. Cl.
CPC .......... *G05B 19/4184* (2013.01); *G05B 9/03* (2013.01); *G05B 19/4185* (2013.01)

(58) Field of Classification Search
None
See application file for complete search history.

(56) References Cited

U.S. PATENT DOCUMENTS 6,662,124 B2 12/2003 Schweitzer et al.
7,496,099 B2 2/2009 Franchuk et al.
(Continued)

FOREIGN PATENT DOCUMENTS

CN 100392410 6/2008
CN 101582759 11/2009
(Continued)

OTHER PUBLICATIONS

Extended European Search Report for European Application Serial No. 15201993.1, dated May 23, 2016, 8 pages.
(Continued)

*Primary Examiner* — Bernard G Lindsay
(74) *Attorney, Agent, or Firm* — Amin, Turocy & Watson, LLP

(57) ABSTRACT

A single-wire safety system architecture yields reliable safety device monitoring without the need for dual redundant signal channels. The safety system comprises a safety relay and one or more compatible safety input devices connected in series with the safety relay via a single-wire communication circuit. A safety signal with a recognizable pulse pattern traverses the single-wire safety circuit to the safety relay via the safety devices. The safety relay opens its contactors and deenergizes its associated industrial equipment if the pulse pattern is not received and recognized. The safety relay can also be configured to initiate a global emergency stop in response to a loss of a safety function by one of its safety input devices, the global emergency stop instructing other safety relays of other safety circuits to open their contactors and enter safe mode.

20 Claims, 24 Drawing Sheets

(56) References Cited

U.S. PATENT DOCUMENTS

| | | | |
|---|---|---|---|
| 8,170,693 B2* | 5/2012 | Mahew | A63J 1/02 700/12 |
| 9,461,459 B2 | 10/2016 | Henneberger | |
| 2003/0061293 A1* | 3/2003 | Steindl | H04L 12/403 709/208 |
| 2005/0057868 A1 | 3/2005 | Pullman et al. | |
| 2007/0263595 A1 | 11/2007 | Charrat | |
| 2009/0252068 A1 | 10/2009 | Charles et al. | |
| 2011/0098829 A1* | 4/2011 | Weddingfeld | G05B 19/052 700/2 |
| 2011/0241447 A1 | 10/2011 | Ando et al. | |
| 2012/0268107 A1 | 10/2012 | Laturner | |
| 2014/0075235 A1 | 3/2014 | Chandhoke et al. | |
| 2014/0100675 A1 | 4/2014 | Dold | |
| 2014/0101486 A1 | 4/2014 | Henneberger et al. | |
| 2014/0168837 A1 | 6/2014 | Henneberger | |
| 2015/0185708 A1* | 7/2015 | Prosak | G05B 19/056 700/79 |
| 2016/0178125 A1* | 6/2016 | Nair | G05B 19/0425 307/328 |
| 2016/0290559 A1 | 10/2016 | Nair et al. | |
| 2016/0299484 A1 | 10/2016 | Nair et al. | |
| 2017/0123396 A1* | 5/2017 | Papenbreer | G05B 19/048 |

FOREIGN PATENT DOCUMENTS

| | | |
|---|---|---|
| CN | 102208888 | 10/2011 |
| EP | 1 521 145 | 4/2005 |
| EP | 2256565 A2 | 1/2010 |
| EP | 2 383 623 | 11/2011 |
| EP | 2 383 762 | 11/2011 |
| EP | 3 023 848 | 5/2016 |
| EP | 3260935 A1 | 6/2017 |

OTHER PUBLICATIONS

Extended European Search Report for European Application Serial No. 15195659.6, dated Mar. 24, 2016, 8 pages.
European Office Action for EP Application Serial No. 15195659.6, dated May 31, 2016, 2 pages.
European Office Action for EP Application Serial No. 15201993.1, dated Jul. 4, 2016, 2 pages.
Non-Final Office Action for U.S. Appl. No. 15/187,850, dated Apr. 6, 2017, 23 pages.
Non-Final Office Action for U.S. Appl. No. 15/187,859, dated Apr. 10, 2017, 20 pages.
Non-Final Office Action for U.S. Appl. No. 14/580,178, dated Mar. 24, 2017, 28 pages.
Non-Final Office Action for U.S. Appl. No. 14/550,833, dated Apr. 6, 2017, 39 pages.
Notice of Allowance for U.S. Appl. No. 14/580,178 dated Jul. 11, 2017, 20 pages.
Notice of Allowance for U.S. Appl. No. 15/187,850 dated Aug. 7, 2017, 15 pages.
Notice of Allowance for U.S. Appl. No. 15/187,859 dated Aug. 16, 2017, 19 pages.
Final Office Action for U.S. Appl. No. 14/550,833 dated Aug. 10, 2017, 27 pages.
Extended European Search Report for European Application Serial No. 17176561.3 dated Nov. 7, 2017, 9 pages.
Extended European Search Report for European Application Serial No. 17176560.5 dated Nov. 15, 2017, 8 pages.
English translation of Office Action and Search Report for Chinese Application Serial No. 201510819047.5 dated Sep. 22, 2017, 6 pages.
European Office Action for European Application Serial No. 15201993.1, dated Mar. 20, 2018, 7 pages.
European Office Action for European Application Serial No. 17176561.3 dated Mar. 3, 2020, 8 pages.
First Search Report for Chinese Application Serial No. 201510971462.2 dated Feb. 24, 2018, 1 page.
Chinese Office Action for Chinese Application Serial No. 201510971462.2 dated Jan. 8, 2018, 3 pages.
English translation of Office Action for Chinese Application Serial No. 201510971462.2 dated Jan. 31, 2019, 5 pages.
European Office Action for European Application Serial No. 17176561.3 dated Jan. 18, 2021, 7 pages.
Extended European Search Report received for EP Patent Application Serial No. 21177192.8 dated Nov. 21, 2021, 10 pages.

* cited by examiner

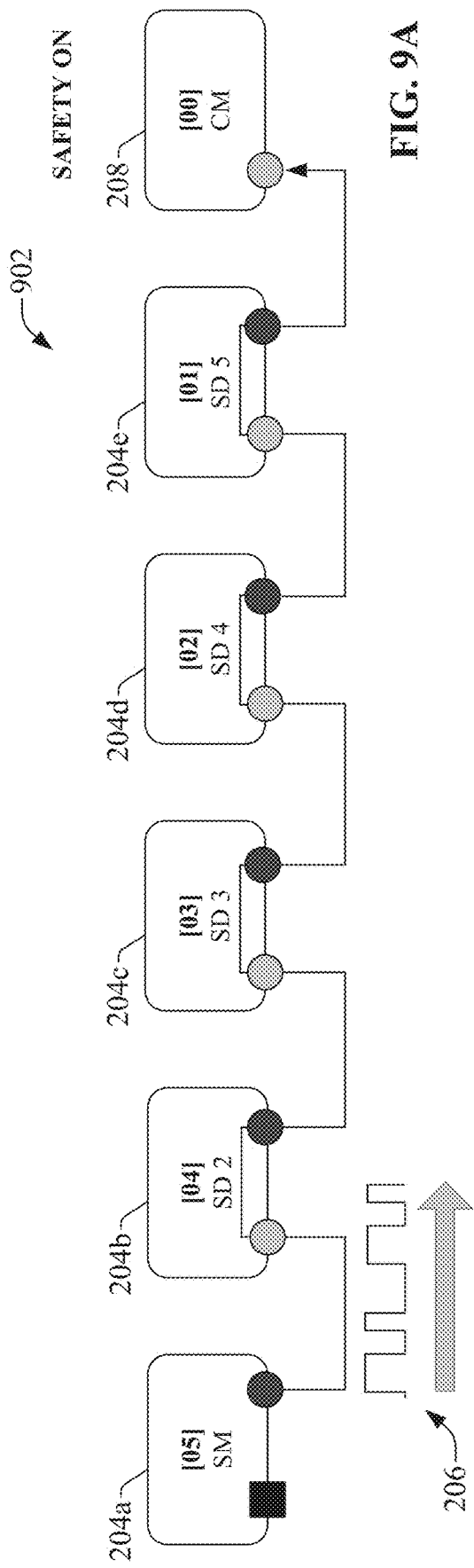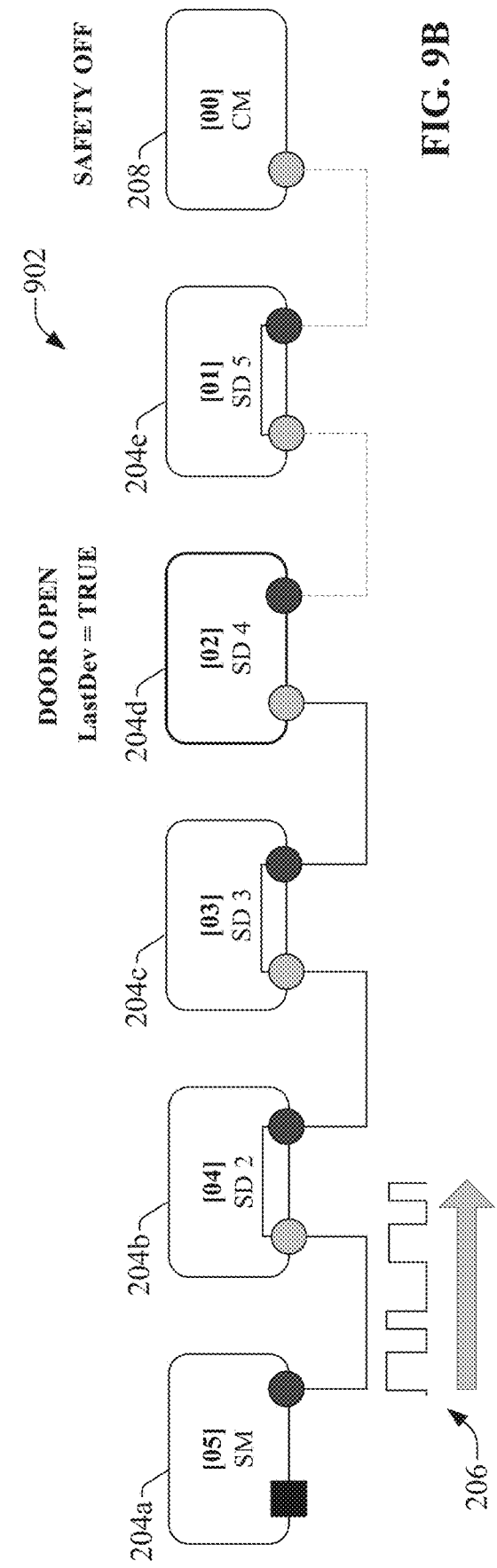

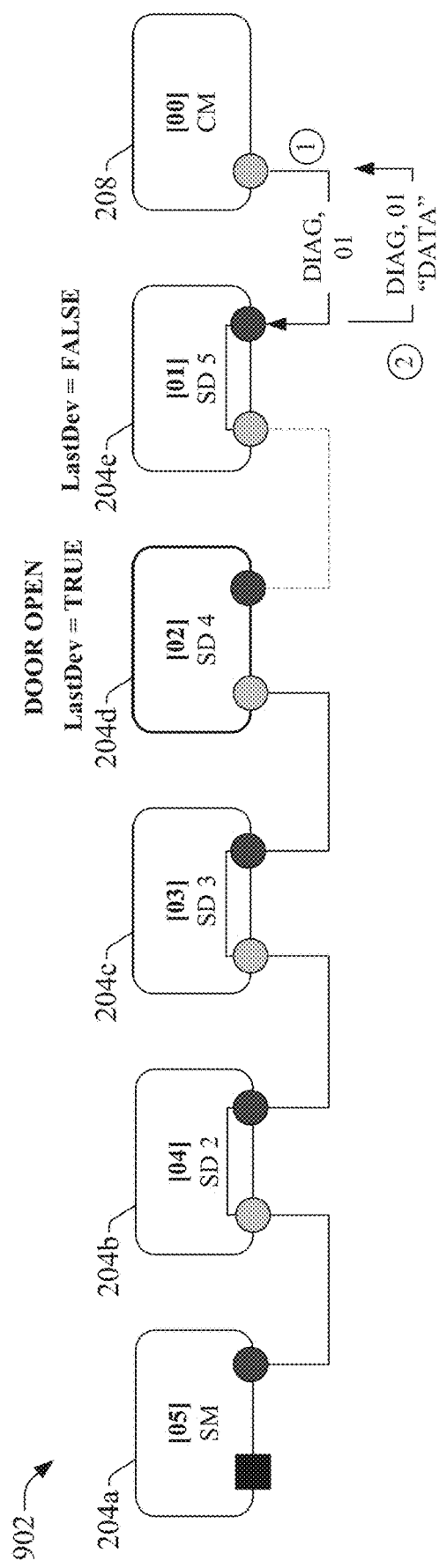
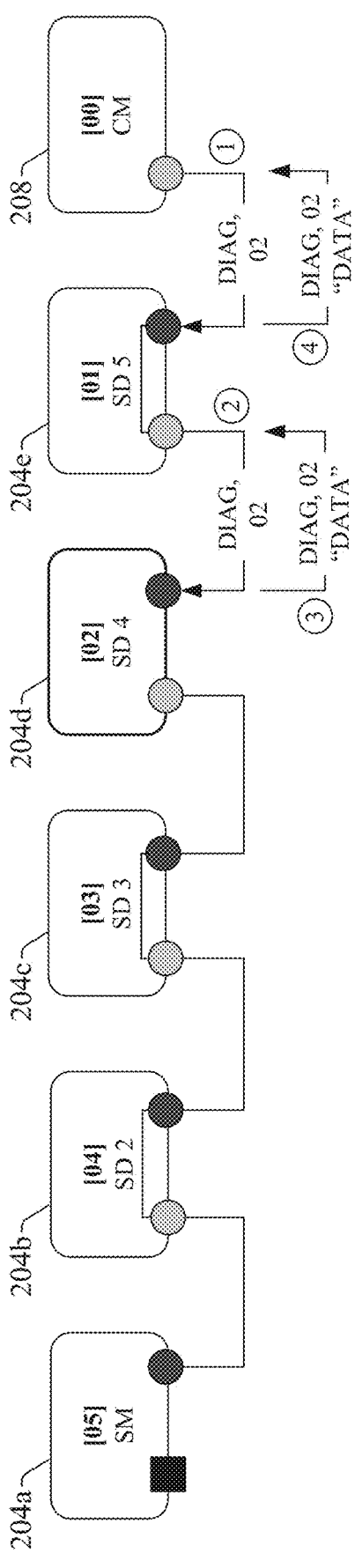
FIG. 9C
FIG. 9D

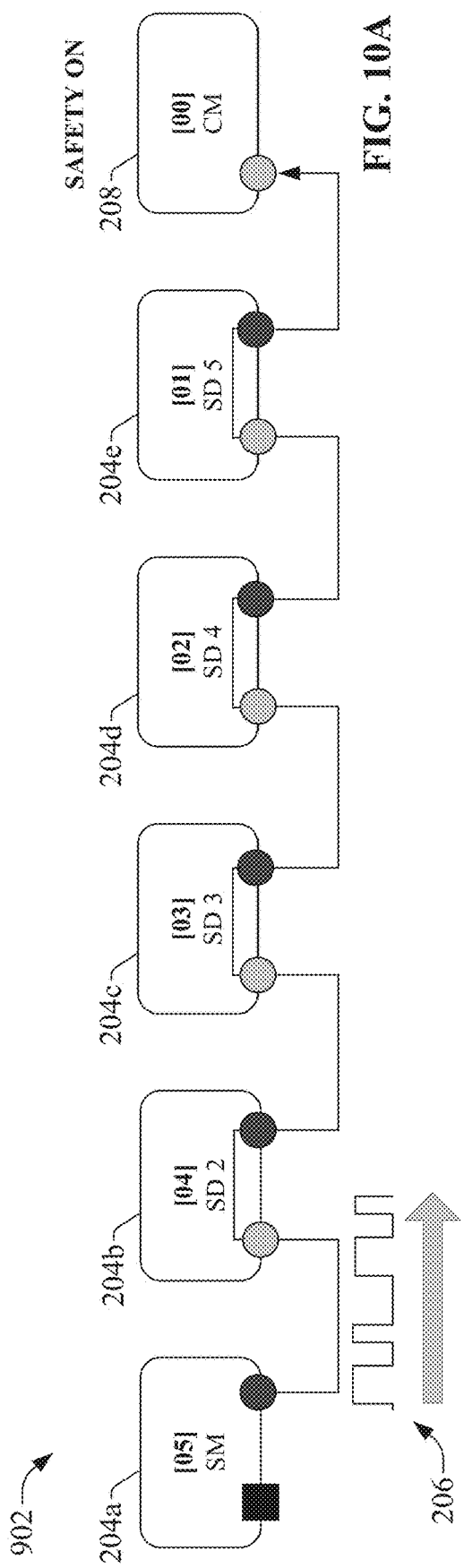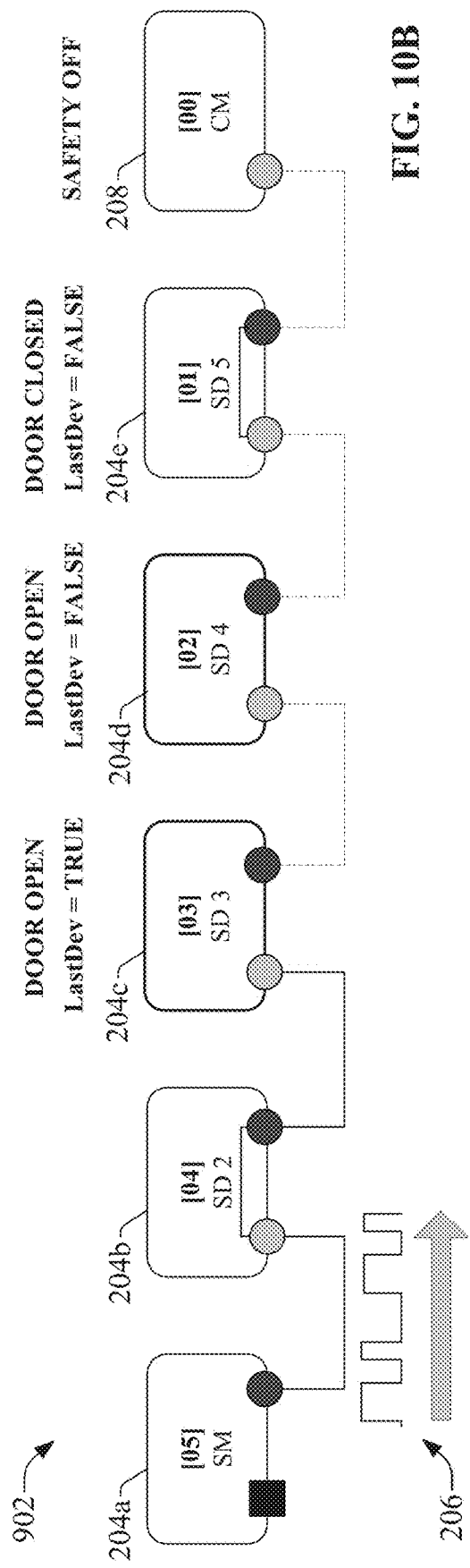

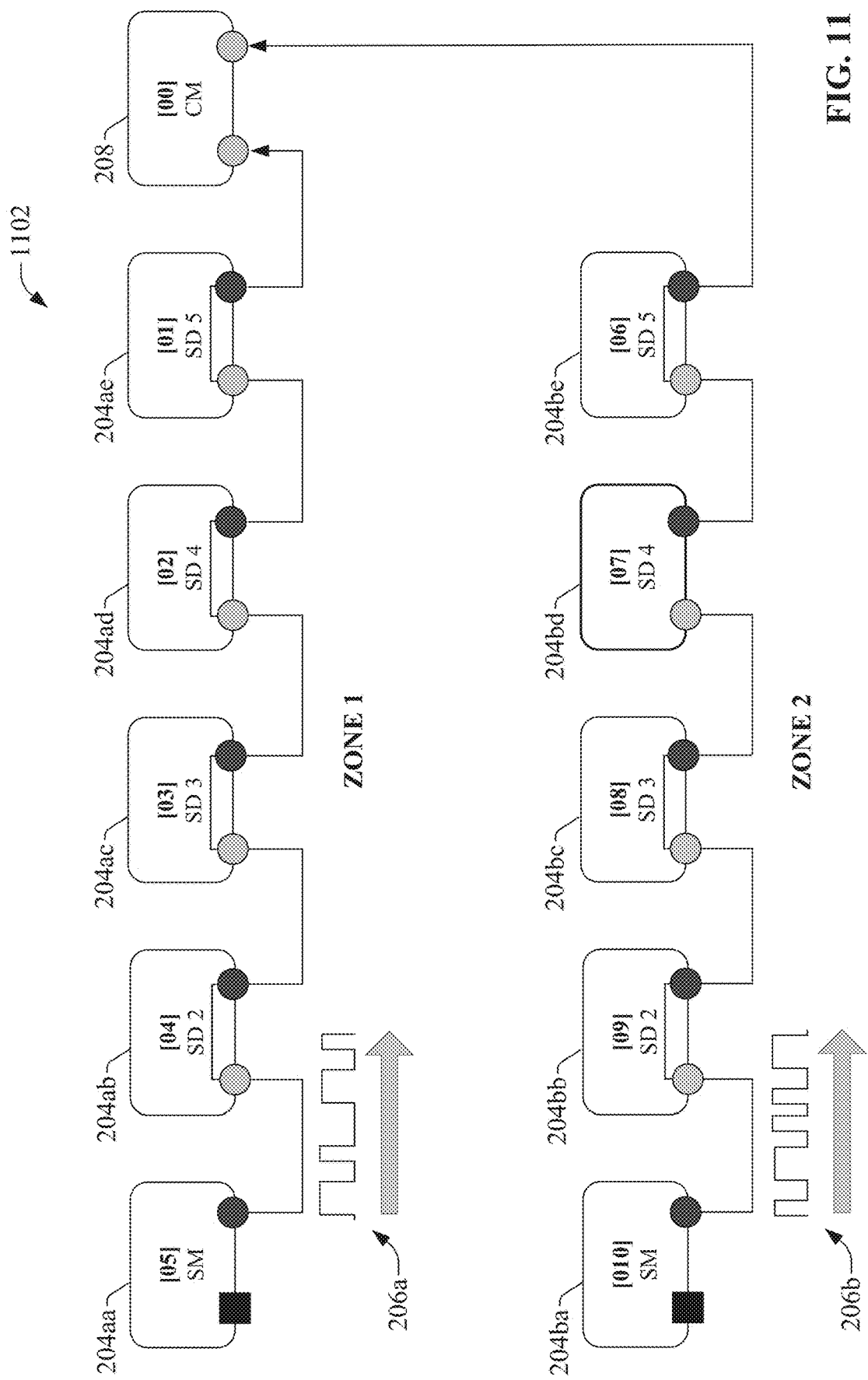

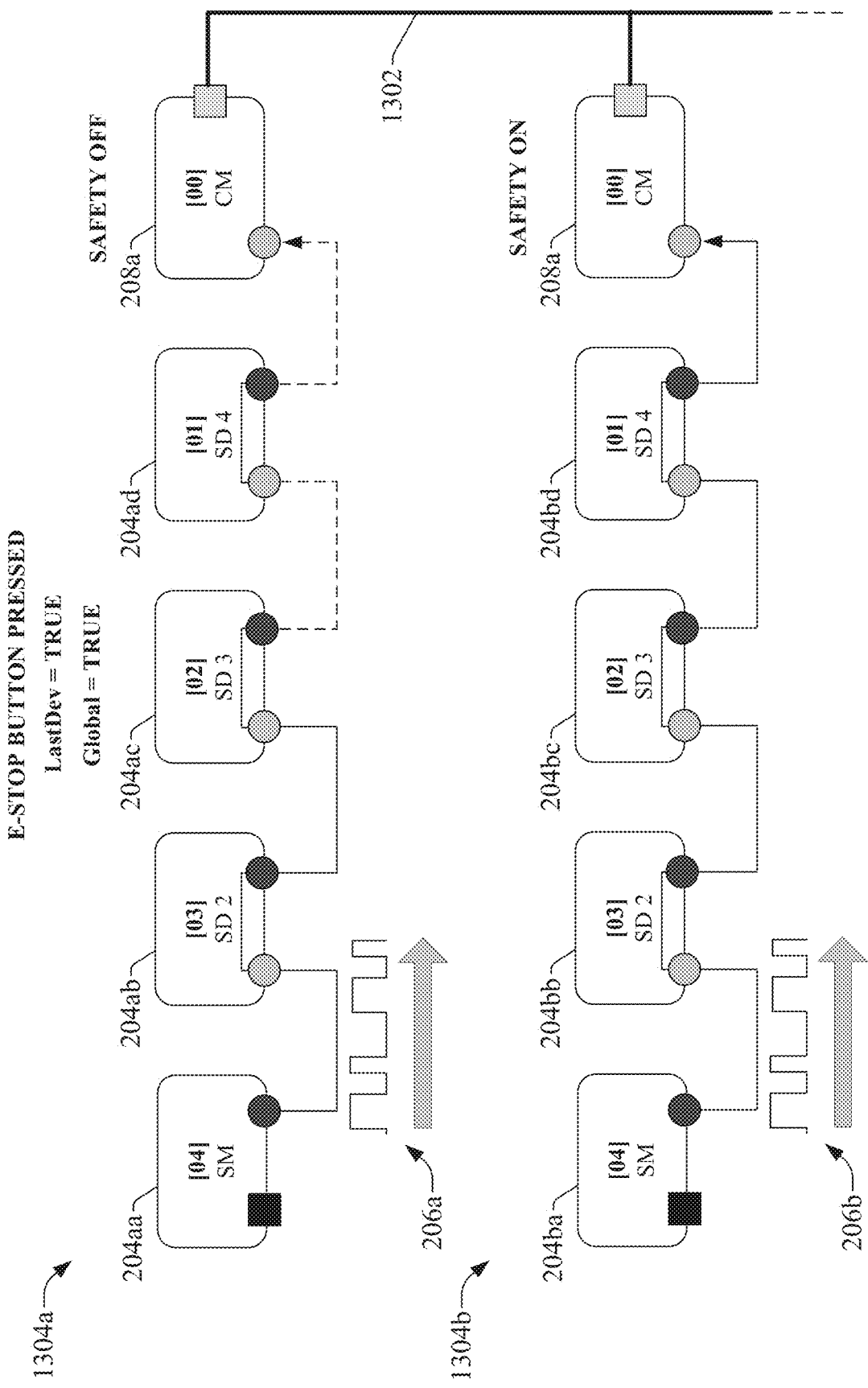

GLOBAL E-STOP IN AN INDUSTRIAL SAFETY SYSTEM WITH LOCAL AND GLOBAL SAFETY INPUT DEVICES

BACKGROUND

The subject matter disclosed herein relates generally to industrial safety systems, and, for example, to emergency stop functionality.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a safety master device is provided, comprising a safety contactor configured to selectively connect and disconnect power from industrial equipment; a networking component configured to communicatively connect the safety master device to a network and exchange data with one or more other safety master devices over the network; a pulse verification component configured to receive a pulse signal via a single-wire safety channel and to determine whether the pulse signal conveys a defined pulse pattern; a relay control component configured to place the safety contactor in a connected state while the defined pulse pattern is identified on the pulse signal, and to place the safety contactor in a disconnected state in response to detecting a loss of the defined pulse pattern on the pulse signal; a message processing component configured to, in response to detecting the loss of the define pulse pattern on the pulse signal, send a diagnostic message directed to a safety input device on the single-wire safety channel that caused the loss of the defined pulse pattern; and a global e-stop component configured to, in response to determining that a response message received from the safety input device via the single-wire safety channel indicates that the safety input device is a global emergency stop device, instruct the one or more other safety master devices to place their respective safety contactors in their disconnected states.

Also, one or more embodiments provide a method for operating an industrial safety system, comprising monitoring, by a safety master device of a single-wire industrial safety circuit, a single-wire safety input terminal of the safety master device for presence of a pulse signal carrying a defined pulse pattern; in response to detecting, based on the monitoring, loss of the pulse signal: switching, by the safety master device, a safety contactor of the safety master device from a connected state to a disconnected state that disconnects power to one or more items of industrial equipment; and sending, by the safety master device via the single-wire safety input terminal, a diagnostic message directed to a safety input device on the single-wire safety circuit that caused the loss of the pulse signal; and in response to determining that a response message received from the safety input device via the single-wire safety input terminal identifies the safety input device as a global emergency stop device, instructing, by the safety master device, one or more other safety master devices networked to the safety master device to transition their respective safety contactors to their disconnected states.

Also, according to one or more embodiments, a non-transitory computer-readable medium is provided having stored thereon instructions that, in response to execution, cause a safety master device to perform operations, the operations comprising monitoring a single-wire safety input terminal of the safety master device for presence of a pulse pattern carried on a safety signal, wherein the single-wire safety input terminal connects the safety master device to a single-wire safety circuit; in response to detecting, based on the monitoring, loss of the pulse pattern: opening a safety contactor of the safety master device, wherein the safety contactor is configured to provide power to one or more items of industrial equipment while closed; and sending, via the single-wire safety input terminal, a diagnostic message directed to a safety input device on the single-wire safety circuit that is preventing the safety signal from proceeding to the single-wire safety input terminal; and in response to determining that a response message received from the safety input device via the single-wire safety input terminal identifies the safety input device as a global emergency stop device, sending a global emergency stop signal to one or more other safety master devices networked to the safety master device to open their respective safety contactors.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 9A-9D are block diagrams illustrating example safety and diagnostic modes for an example single-wire safety system.

FIGS. 10A-10F are block diagrams illustrating how messaging is performed in a scenario in which multiple safety devices switch to their unsafe states due to their doors being opened.

FIG. 11 is a diagram illustrating a SWS+ safety circuit comprising a comms master device that monitors safety devices on two single-wire channels.

FIGS. 13A-13E are diagrams illustrating an example architecture in which two independent safety circuits are communicatively connected via a network and can share global emergency stop signals.

DETAILED DESCRIPTION

Figure 1:
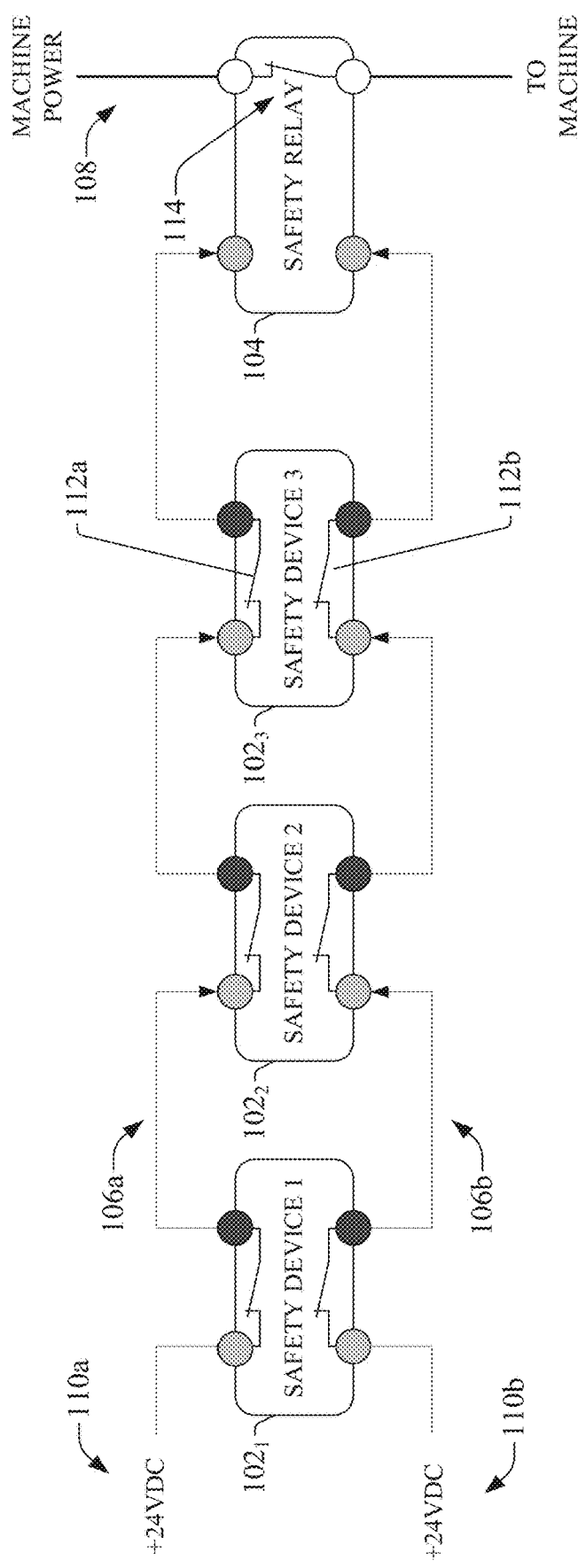
FIG. 1 is a block diagram of an example safety circuit that utilizes redundant signal paths to improve safety reliability.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Modern industrial automation systems often include a number of hazardous machine access points that, if breached during operation, may cause injury to an operator. These access points can expose the operator to risks associated with dangerous machine components, including but not limited to crushing by moving parts, electrocution through contact with exposed high-voltage lines or components, chemical burn, laceration or dismemberment by a moving blade, radiation exposure, or other such hazards To mitigate the risks associated with these access points, plant engineers typically implement safety systems designed to protect operators who interact with the access points. These safety systems may include a safety relay or safety controller that monitors the states of various safety input devices, and disconnects power to hazardous machine components if any of the safety input devices indicate a potentially unsafe condition. An example safety input device may comprise a proximity switch installed on a safety gate that provides access to a hazardous machine. The proximity switch output may be provided as an input to the safety relay, which operates a contactor through which power is provided to the machine. When the proximity switch indicates that the safety gate is open, the safety relay opens the contactor to isolate power from the machine. In another example, an access point that allows an operator to load a part into a stamping press area may be protected by a light curtain that detects when a physical body (e.g., an operator's arm) has reached through the access point. As with the example proximity switch described above, the light curtain's output can be tied to the safety relay as an input, such that the safety relay isolates power to the press while the light curtain is broken by the detected body. Other example safety input devices that can be monitored by a safety relay can include, but are not limited to, emergency stop pushbuttons, industrial safety mats that detect human presence at a particular area based on weight detection, emergency pull-cord devices, photoelectric or laser-based sensors, or other such safety detection devices.

The functional safety solutions implemented for a hazardous access point must be compliant with current industry-specific functional safety standards, such as those defined by the International Organization for Standardization (ISO) or the International Electrotechnical Commission (IEC). Such standards may define formal methodologies for determining a risk level associated with a machine, and provide statutory guidelines for designing safety systems to mitigate the risk. These safety standards dictate safety system types and configurations that must be implemented to counter a particular type of hazard.

To ensure highly reliable safety response even in the event of a failure of one or more safety input devices, safety systems are often designed with dual redundant channels for conveying a safety signal. FIG. 1 illustrates an example safety circuit that utilizes redundant signal paths to improve safety reliability. In this example, safety devices 102 are connected in series to a safety relay 104. Safety devices 102—also referred to as safety input devices—comprise devices that verify whether the safety relay should enter the safe state based on their respective access points, including but not limited to proximity switches that determine when a safety gate is in the closed position, emergency stop pushbuttons, safety mats, light curtains, etc. Each of the safety devices 102 are equipped with dual redundant contacts 112a and 112b that are designed to close when the device is in the safe state, allowing respective 24 VDC signals 110 to pass.

Safety relay 104 includes at least one resettable contact 114 that controls the connection of machine power 108 to at least one machine, motor, or industrial device. Safety relay 104 will only allow the contact 114 to be reset if both 24 VDC signals are detected, indicating that all safety devices 102 have validated their safety functions. If any of the safety devices 102 switch to an unsafe state (e.g., a light curtain is broken, an emergency stop button is pressed, a safety door is opened, etc.), thereby invalidating their safety functions, the circuit to the safety relay 104 is broken and the safety relay 104 isolates power from the machine, placing the industrial system in a safe state by preventing hazardous motion.

The use of two separate paths through the safety devices improves safety reliability by ensuring that the safety relay 104 disconnects machine power when a safety device switches to an unsafe state even in the event that one of the safety device's internal contacts has failed. That is, even if one of the two contacts within a safety device has fused closed, the second contact will still open in response to detection of the unsafe state, ensuring that the safety relay 104 will see the loss of the 24 VDC signal and disconnect power from the machine. While providing an enhanced degree of safety reliability, implementation of dual redundant signal paths consumes additional terminal space and doubles the wiring requirement relative to a single-wire solution. Moreover, the presence of two separate channels introduces the possibility of cross faults between the two lines, which can prevent the safety relay from detecting an open in the safety circuit.

Also, some industrial environments include multiple production cells or zones that are each protected by their own separate safety circuits. In some such environments, the operational activities in one zone may be dependent on the activity in one or more other zones. As such, it may be necessary in some scenarios for an emergency stop condition originating in one zone to deenergize not only the hazardous machines in the originating zone but also the machines in one or more other zones.

Figure 2:
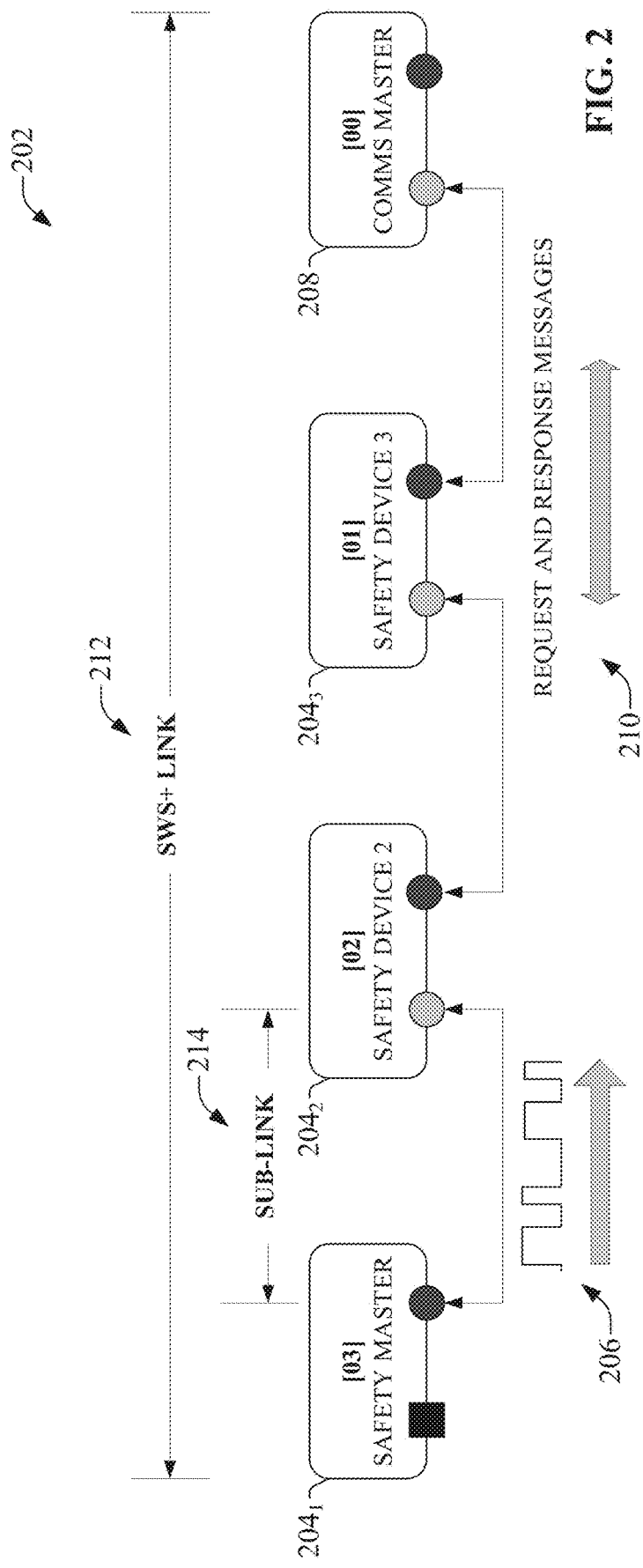
FIG. 2 is a block diagram of an example single-wire safety system architecture.

To address these and other issues, one or more embodiments of the present disclosure provide a single-wire safety system architecture that provides reliable safety device monitoring without the need for dual redundant signal channels, and which also supports sharing of global emergency stop signals between otherwise independently operating safety systems. FIG. 2 illustrates an example single-wire safety system architecture 202 according to one or more embodiments. The safety system architecture 202 comprises a safety relay—or safety master device—acting as a communications master device 208 (referred to herein as a "comms master device") and three safety devices 204 connected in series with the comms master device 208 (although any number of safety devices 204 may be added to the safety circuit without departing from the scope of this disclosure). The safety devices 204 are configured for compliance with a single-wire safety communication protocol. Safety device $204_1$, which is farthest from the comms master device 208 in the communication chain, serves as a safety master. A safety device 204 acting as safety master generates a defined pulsed safety signal 206 that is passed through each safety device 204 in the chain to the comms master device 208 (the safety relay), which remains in operational mode as long as the defined pulse train on the safety signal 206 is recognized. The total path between the safety master device $204_1$ and the comms master device 208 comprises a single-wire safety plus (SWS+) link 212, which is made up of multiple sub-links 214 between adjacent safety devices on the circuit. When one of the safety devices 204 identifies the loss of its safety function (e.g., opening of a safety gate, pressing of an emergency stop button, etc.) and enters the unsafe state, that device 204 ceases to pass the pulse train signal 206 to downstream devices 204 and 208, preventing the signal from reaching the comms master device 208. Upon detecting loss of the pulse train signal, the comms master device 208 isolates power to the industrial system components (e.g., machine, industrial device, motor, etc.).

In some embodiments, to ensure a high degree of safety reliability without the use of dual redundant signal channels, each safety device 204 on the circuit is configured to perform a two-channel evaluation of the pulse signal. Moreover, the safety master device $204_1$, which generates the pulse train signal 206, can be configured to monitor two-channel feedback of the output signal, such that short-circuiting of the signal to 24 VDC, 0 VDC, or to other clocked signals can be detected.

The architecture implements a bi-directional communication protocol on the single-wire safety channel, allowing the devices in the chain to share information—including but not limited to status data, address information, presence indications, etc.—via the same channel over which the pulsed signal is sent. The single-wire protocol allows the safety devices 204 and comms master device 208 to exchange request and response messages 210 over the channel, while coordinating sending and receiving of these messages with transmission of the pulse train signal 206.

As will be described in more detail herein, safety devices 204 can be configured to initiate either a local emergency stop (e-stop) or a global e-stop. A local e-stop will cause only the comms master device 208 on the same safety circuit as the safety device 204 to disconnect power from the local machines being monitored by the safety circuit. A global e-stop causes the comms master device 208 to broadcast a global e-stop message to one or more other comms master devices 208 of other safety circuits, causing those comms master devices 208 to disconnect power from their local hazardous machines. In an example architecture, multiple comms masters 208 can be networked together to allow sharing of global e-stop messages.

Figure 3:
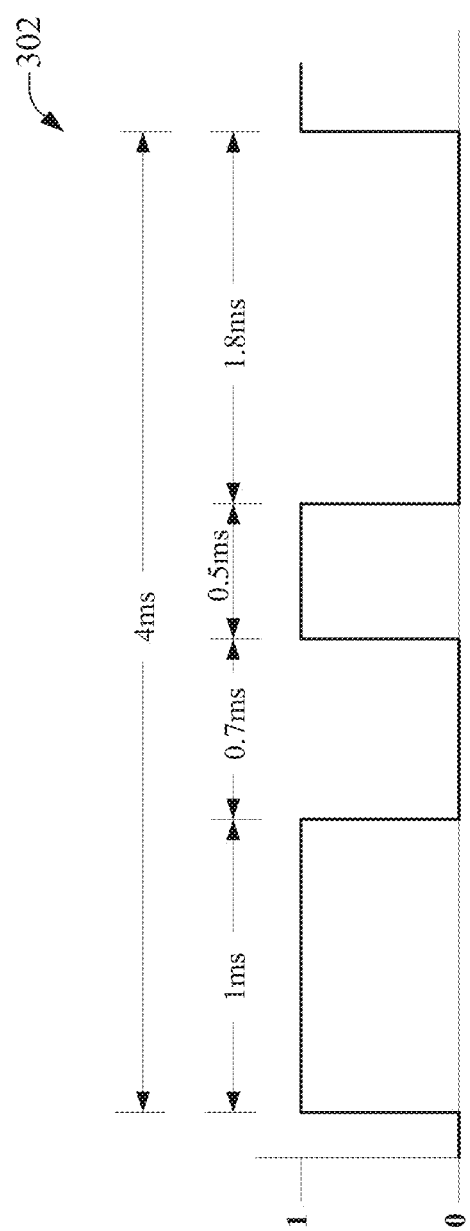
FIG. 3 is a timing chart of an example pulse signal that can be generated by a safety master device.

FIG. 3 is a timing diagram of an example pulse signal 302 that can be generated by the safety master device 204. The pulse pattern illustrated in FIG. 3 is not intended to be limiting, and it is to be appreciated that any pulse pattern may be implemented without departing from the scope of one or more embodiments of this disclosure. In this example, the pulse signal 302 has a total period of 4 ms, comprising a 1 ms ON signal, a 0.7 ms OFF signal, a 0.5 ms ON signal, and a 1.8 ms OFF signal. Safety devices 204 and comms master devices 208 that are compliant with the single-wire protocol can be configured to recognize and generate this pulse pattern. The comms master device 208 can be configured to enable the safety relay outputs when this pulse pattern is received from the safety device nearest to the comms master on the safety circuit.

Figure 4:
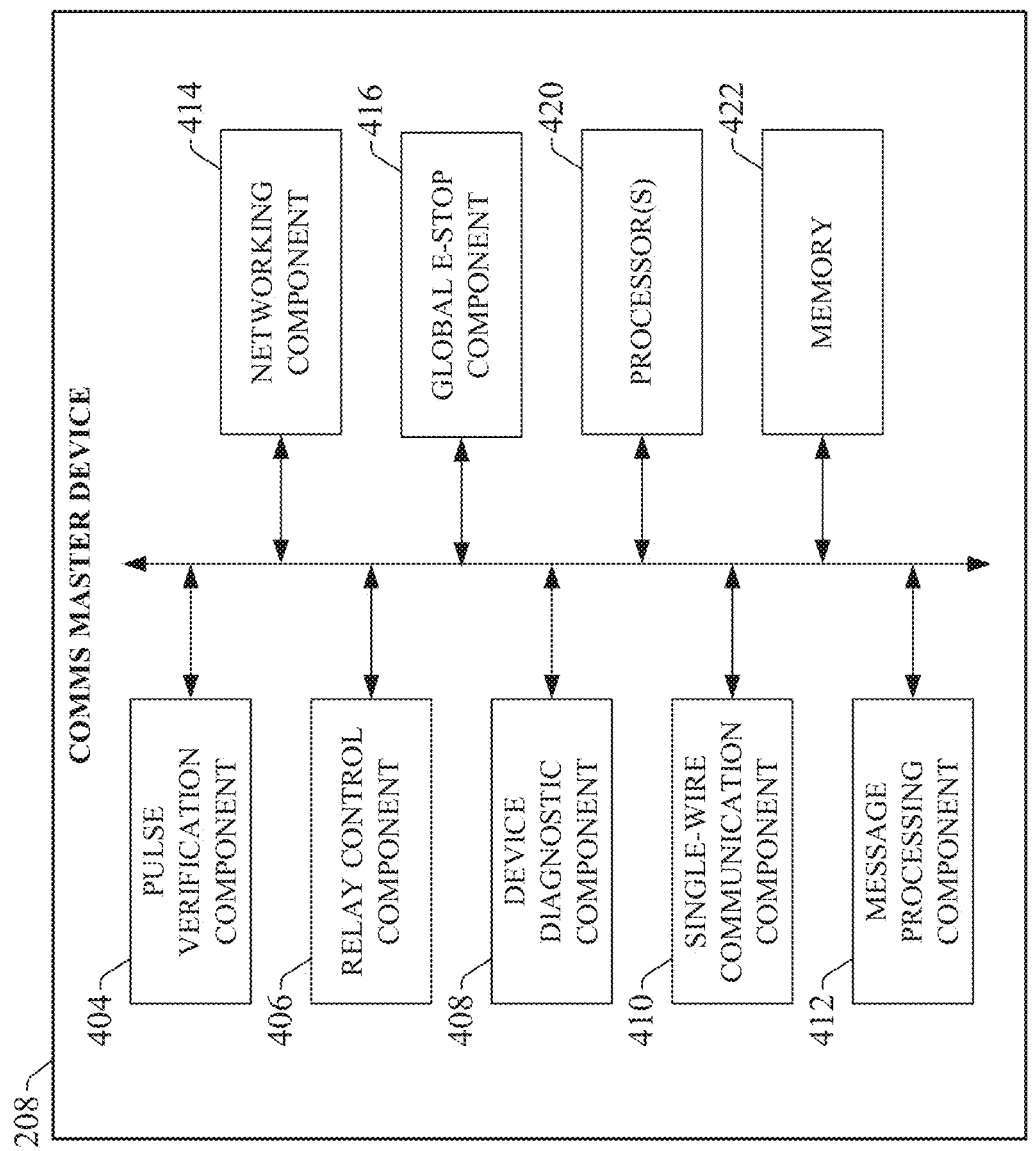
FIG. 4 is a block diagram of an example comms master device.

FIG. 4 is a block diagram of an example comms master device 208 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Comms master device 402 can include a pulse verification component 404, a relay control component 406, a device diagnostic component 408, a single-wire communication component 410, a message processing component 412, a networking component 414, a global e-stop component 416, one or more processors 420, and memory 422. In various embodiments, one or more of the pulse verification component 404, relay control component 406, device diagnostic component 408, single-wire communication component 410, message processing component 412, networking component 414, global e-stop component 416, the one or more processors 420, and memory 422 can be electrically and/or communicatively coupled to one another to perform one or more of the functions of the comms master device 208. In some embodiments, components 404, 406, 408, 410, 412, 414, and 416 can comprise software instructions stored on memory 422 and executed by processor(s) 420. Comms master device 208 may also interact with other hardware and/or software components not depicted in FIG. 4. For example, processor(s) 420 may interact with one or more external user interface devices, such as a keyboard, a mouse, a display monitor, a touchscreen, or other such interface devices.

Pulse verification component 404 can be configured to receive a pulse signal via a single-wire safety input terminal and identify a defined pulse pattern conveyed on the signal (e.g., the example pulse pattern illustrated in FIG. 3 or another pulse pattern). Relay control component 406 can be configured to control the state of one or more safety relays based on detection of the defined pulse pattern by the pulse verification component 404.

Device diagnostic component 408 can be configured to exchange message signals with the safety devices 204 in connection with collecting fault or status information from the devices 204. Single-wire communication component 410 can be configured to coordinate bi-directional data traffic on the signal-wire channel Message processing component 412 can be configured to process input messages received on the single-wire safety input terminal and to send output messages on the single-wire safety input terminal for transmission on the single-wire safety channel. Messages sent and received via the single-wire safety input terminal can include, but are not limited to, enumeration messages, device information request and response messages, messages indicating that the comms master device is active, and other such messages.

Networking component 414 can be configured to communicatively connect the comms master device 208 to a network and exchange data with other comms master devices 208 over the network. Global e-stop component 416 can be configured to issue a global e-stop instruction to one or more other comms master devices 208 over the network connection facilitated by the networking component 414.

The one or more processors 420 can perform one or more of the functions described herein with reference to the systems and/or methods disclosed. Memory 422 can be a computer-readable storage medium storing computer-executable instructions and/or information for performing the functions described herein with reference to the systems and/or methods disclosed.

Figure 5:
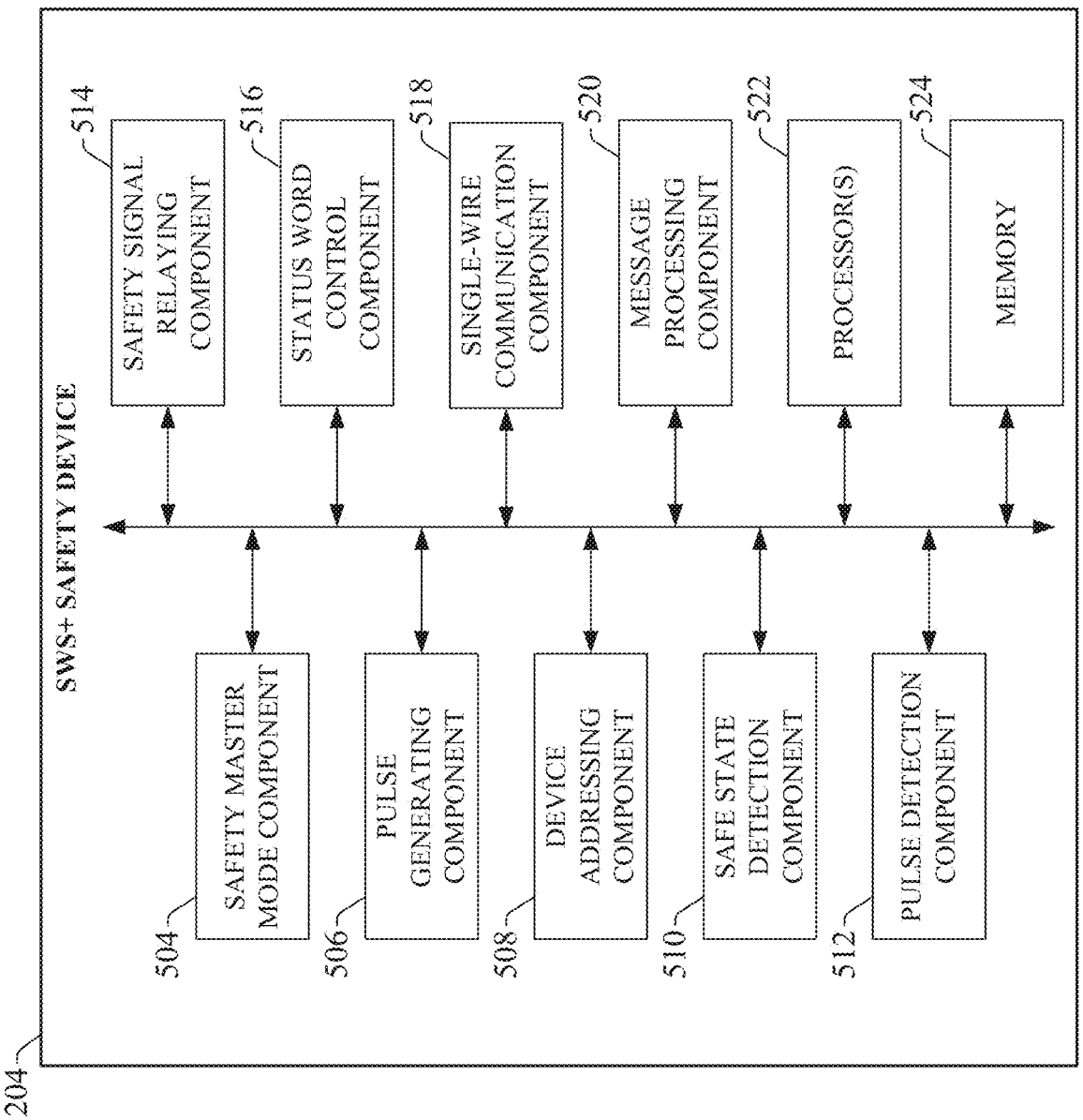
FIG. 5 is a block diagram of an example SWS+ safety device.

FIG. 5 is a block diagram of an example SWS+ safety device 204 according to one or more embodiments of this disclosure. SWS+ safety device 204 can comprise substantially any type of safety input device, including but not limited to an emergency stop pushbutton, a light curtain, photo sensor, a safety mat, a safety door switch (e.g., a proximity switch or reed switch), an emergency pull cord device, a laser scanner, or other type of safety input device.

SWS+ safety device 204 can include a safety master mode component 504, a pulse generating component 506, a device addressing component 508, a safe state detection component 510, a pulse detection component 512, a safety signal relaying component 514, a status word control component 516, a single-wire communication component 518, a message processing component 520, one or more processors 522, and memory 524. In various embodiments, one or more of the safety master mode component 504, pulse generating component 506, device addressing component 508, safe state detection component 510, pulse detection component 512, safety signal relaying component 514, status word control component 516, single-wire communication component 518, message processing component 520, the one or more processors 522, and memory 524 can be electrically and/or communicatively coupled to one another to perform one or more of the functions of the SWS+ safety device 204. In some embodiments, components 504, 506, 508, 510, 512, 514, 516, 518, and 520 can comprise software instructions stored on memory 524 and executed by processor(s) 522. SWS+ safety device 204 may also interact with other hardware and/or software components not depicted in FIG. 5. For example, processor(s) 522 may interact with one or more external user interface devices, such as a keyboard, a mouse, a display monitor, a touchscreen, or other such interface devices.

Safety master mode component 504 can be configured to control whether the safety device 204 operates as a safety master device within a single-wire safety system. If the safety device 204 operates in safety master mode, the device 204 will generate the pulsed safety signal to be placed on the single-wire communication channel. Alternatively, if the safety device 204 does not operate in safety master mode, the device 204 will receive the pulsed safety signal from an upstream safety device via the single-wire communication channel and, if the safety device 204 is not in an unsafe state, relay the pulse signal to the next downstream device on the safety circuit. In one or more embodiments, the safety master mode component 504 can switch the safety device 204 to safety master mode in response to detecting the presence of a terminator on the device's single-wire safety channel input terminal.

The pulse generating component 506 can be configured to generate the pulse pattern (e.g., pulse signal 302 of FIG. 3 or another pattern) and output the pulse pattern on the device's single-wire safety channel output terminal if the safety device 204 is operating in safety master mode. The device addressing component 508 can be configured to set an address for the safety device 204, and to report this address to other devices on the safety circuit via messages sent over the single-wire communication channel. The safe state detection component 510 can be configured to determine whether the safety device 204 is in its unsafe state. The conditions for identifying the unsafe state of the safety device 204 depend on the type of safety device 204. For example, a door-mounted reed switch is considered to be in its unsafe state when the switch is not in proximity to its corresponding magnet, indicating that the safety door on which the switch is mounted is opened. In another example, a light curtain is considered to be in its unsafe state when objects are detected between the light curtain's transmitter and receiver photo-arrays.

Pulse detection component 512 can be configured to identify presence of the defined pulse pattern on the device's single-wire safety channel input terminal. The safety signal relaying component 514 can be configured to relay the pulsed safety signal from the single-wire safety channel input terminal to a single-wire communication output terminal for transmission to the next downstream device if certain defined conditions are satisfied. The defined conditions can include at least detection of a valid pulse pattern on the safety signal received at the safety input terminal (as determined by the pulse detection component 512), and verification that the safety device 204 is not in its unsafe state (as determined by the safe state detection component 510).

Status word control component 516 can be configured to set status bits and words based on detected statuses of the safety device 204, and to send the status bits and words to other devices on the safety circuit via the single-wire communication channel. Single-wire communication component 518 can be configured to coordinate bi-directional communication on the single-wire communication channel. Message processing component 520 can be configured to process input messages received on either the single-wire safety channel input terminal or the single-wire safety channel output terminal, and to send output messages on either the input or output terminal. Input messages received on the input or output terminal via the single-wire channel can include, but are not limited to, requests to provide device information, requests for the safety device's signature, enumeration messages, or other such input messages. Output messages can include, but are not limited to, response messages including the safety device's signature or device information, enumeration messages, device presence messages, relayed requests for another device's information, or other such messages.

The one or more processors 522 can perform one or more of the functions described herein with reference to the systems and/or methods disclosed. Memory 524 can be a computer-readable storage medium storing computer-executable instructions and/or information for performing the functions described herein with reference to the systems and/or methods disclosed.

Figure 6:
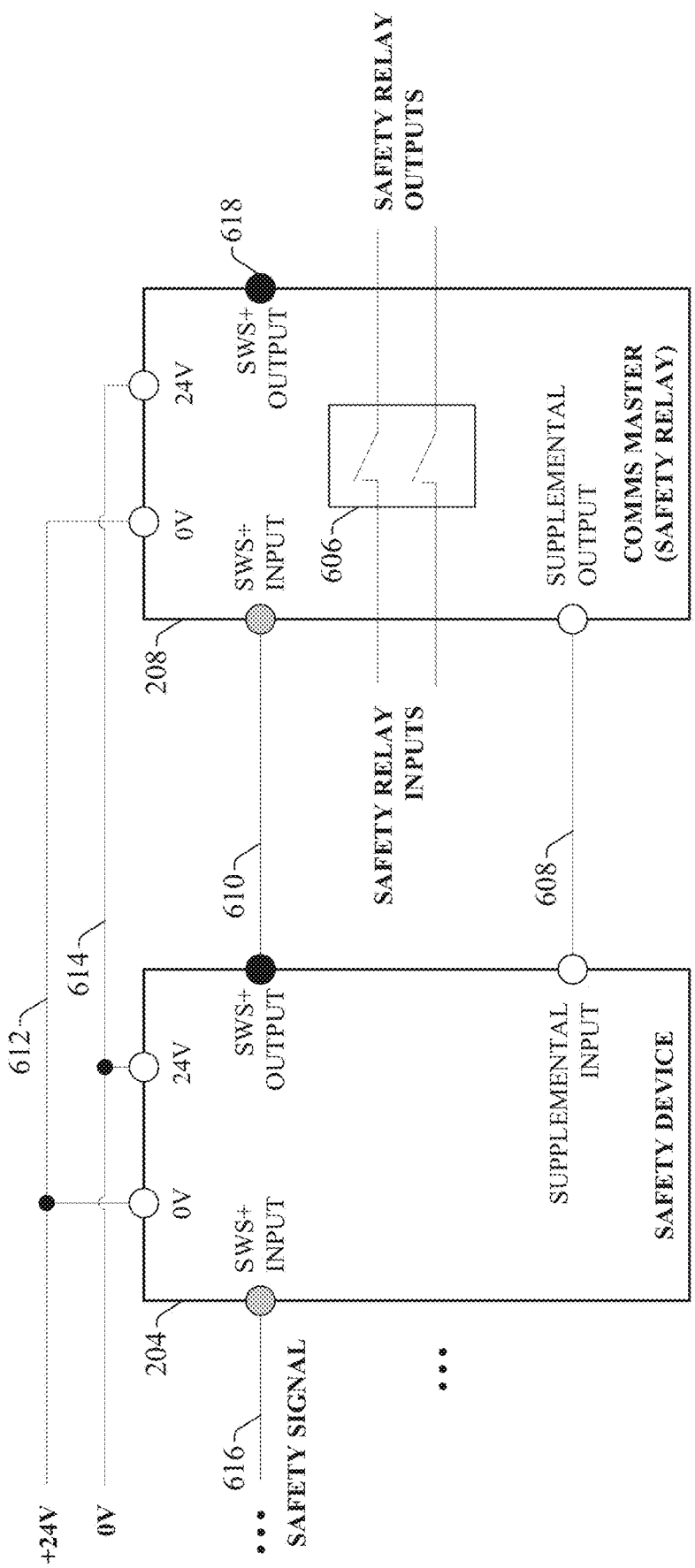
FIG. 6 is an example wiring schematic illustrating connections between a safety device and a comms master.

FIG. 6 is an example wiring schematic illustrating connections between a safety device 204 and a comms master device 208. In this example, safety device 204 includes terminals for 0V and 24 VDC power, an SWS+ INPUT terminal, and an SWS+ OUTPUT terminal. During normal operation (SWS mode), the SWS+ INPUT terminal receives the pulsed safety signal from an upstream safety device 204 (not shown in FIG. 6) on line 616, and the SWS+ OUTPUT terminal sends the safety signal to the next downstream device on line 610 (in the illustrated example, the next downstream device is the comms master device 402; in the present disclosure, the terms "upstream" and "downstream" are relative to the direction of the pulsed safety signal from the safety master to the comms master). Safety device 204 will only send the pulse signal out on the SWS+ OUTPUT terminal if the valid pulse pattern is present on the SWS+ INPUT terminal and the safety device 204 is not in the unsafe state. During diagnostic or configuration mode, safety device 204 uses the SWS+ INPUT and SWS+ OUTPUT terminals to exchange configuration or diagnostic messages with adjacent devices over lines 616 and 610 (the single-wire channel) in a bi-directional manner.

FIG. 6 depicts safety device 204 as being wired for normal operation, whereby the safety device 204 resides between two other devices on the safety circuit. However, if safety device 204 is the last device on the safety circuit, such that there are no other upstream devices from which to receive the safety signal, the safety device can be configured 204 to operate in safety master mode whereby the safety device 204 generates the pulsed safety signal for the safety circuit. In some embodiments, the safety device 204 can be configured to operate in safety master mode by connecting a terminator to the device's SWS+ INPUT terminal. When this terminator is detected on the SWS+ INPUT terminal, safety device 204 is configured to operate in safety master mode. Alternatively, the safety device 204 can be placed in safety master mode by other means, including but not limited to a configuration switch or a software-configurable operating parameter.

Comms master 208 includes terminals for 0V and 24 VDC power, an SWS+ INPUT terminal for receiving the pulse signal on line 610, and an SWS+ OUTPUT terminal 618 for sending the pulse signal to another device (e.g., an expansion relay module or other device). Since the comms master 208 is typically a safety relay configured to comply with the single-wire communication protocol described herein, the comms master 208 also includes one or more safety contactors 606 for controlling application of machine power to one or more industrial machines or devices.

In some embodiments, comms master 208 may also include a SUPPLEMENTAL OUTPUT terminal for sending supplemental messages to safety devices 204 on the safety circuit via a dedicated line 608 that is separate from the SWS channel. These messages can be received via SUPPLEMENTAL INPUT terminal on safety device 204. For example, comms master 208 may use the SUPPLEMENTAL OUTPUT terminal to send lock commands to safety devices that have integrated mechanical locks; e.g., remotely actuated door locks that include proximity switches to determine when the door is in the closed position. In such scenarios, the comms master 208 can be programmed to actuate the locks in response to defined conditions to prevent the doors from being opened during dangerous operations. In another example, the comms master 208 may be configured to output a signal on the SUPPLEMENTAL OUTPUT terminal that, when received by the safety devices 204, forces the safety devices 204 to switch from operational mode to the unsafe state (configuration or diagnostic mode).

Figure 7:
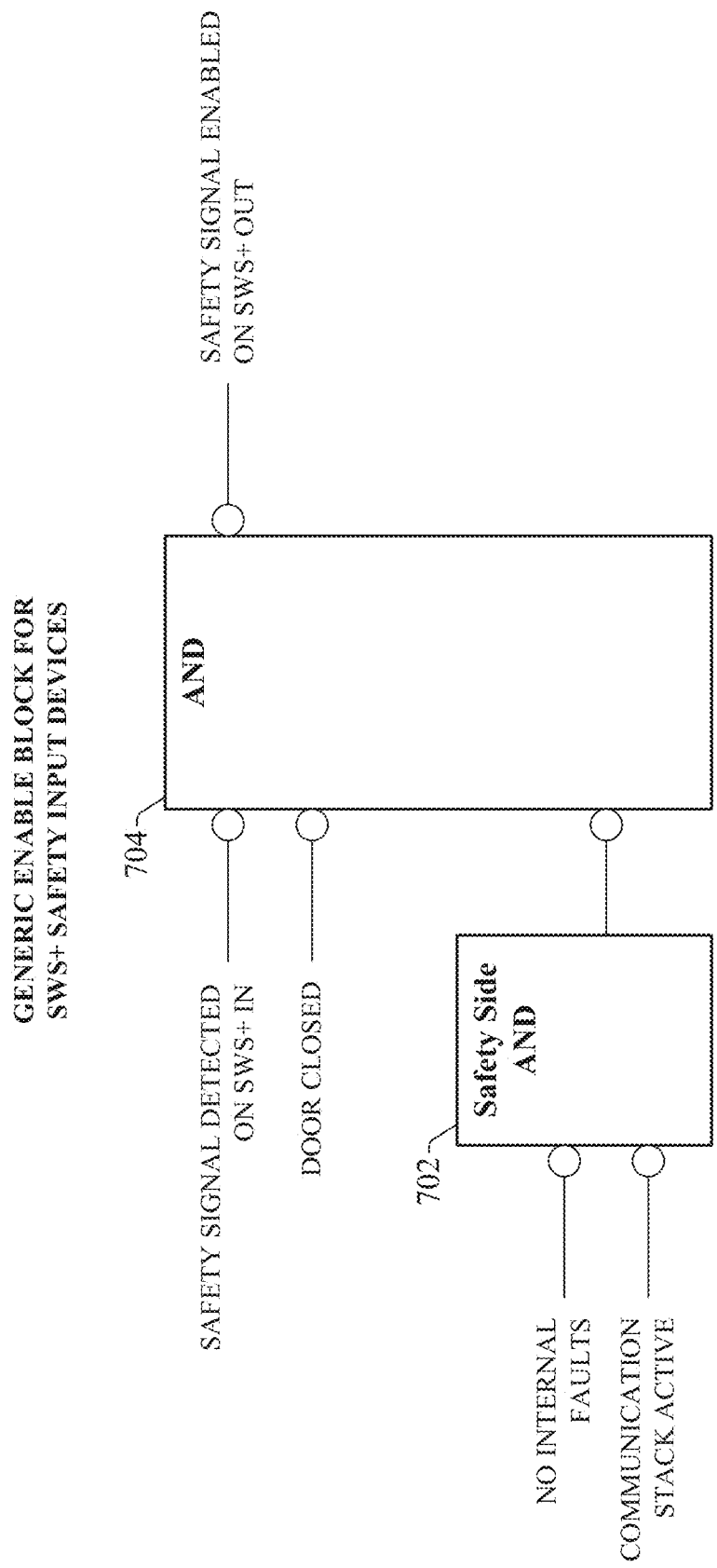
FIG. 7 is an example logic diagram illustrating enable conditions for an SWS+ OUTPUT terminal of a single-wire safety input device.

FIG. 7 is an example logic diagram illustrating the enable conditions for outputting the safety signal on the SWS+ OUTPUT terminal of safety device 204. The illustrated logic diagram can be implemented, for example, by the safety signal relaying component 514 illustrated in FIG. 5. In this example, the safety device 204 is assumed to be a safety door switch that uses a proximity switch or reed switch to determine when a safety door or gate is in the closed position. AND block 704 determines whether the safety signal is detected on the safety device's SWS+ INPUT terminal, and whether the safety device 204 registers its safety function as valid (in this example, the safe state is active when the door is closed) and whether the SUPPLEMENTAL OUTPUT is requesting the device to be in the safe state. The safety side AND block 702 determines whether any internal device faults are active, and whether the device's communication stack has become active. If no (a) internal faults are detected, (b) the communication stack is active, (c) the door is closed, (d) the SUPPLEMENTAL OUTPUT is not requesting a safe state, and (e) the safety signal is detected on the SWS+ INPUT terminal, the safety device 204 enables the safety signal on the SWS+ OUTPUT terminal, thereby passing the received pulsed safety signal to the next sub-link of the single-wire safety channel.

Figure 8:
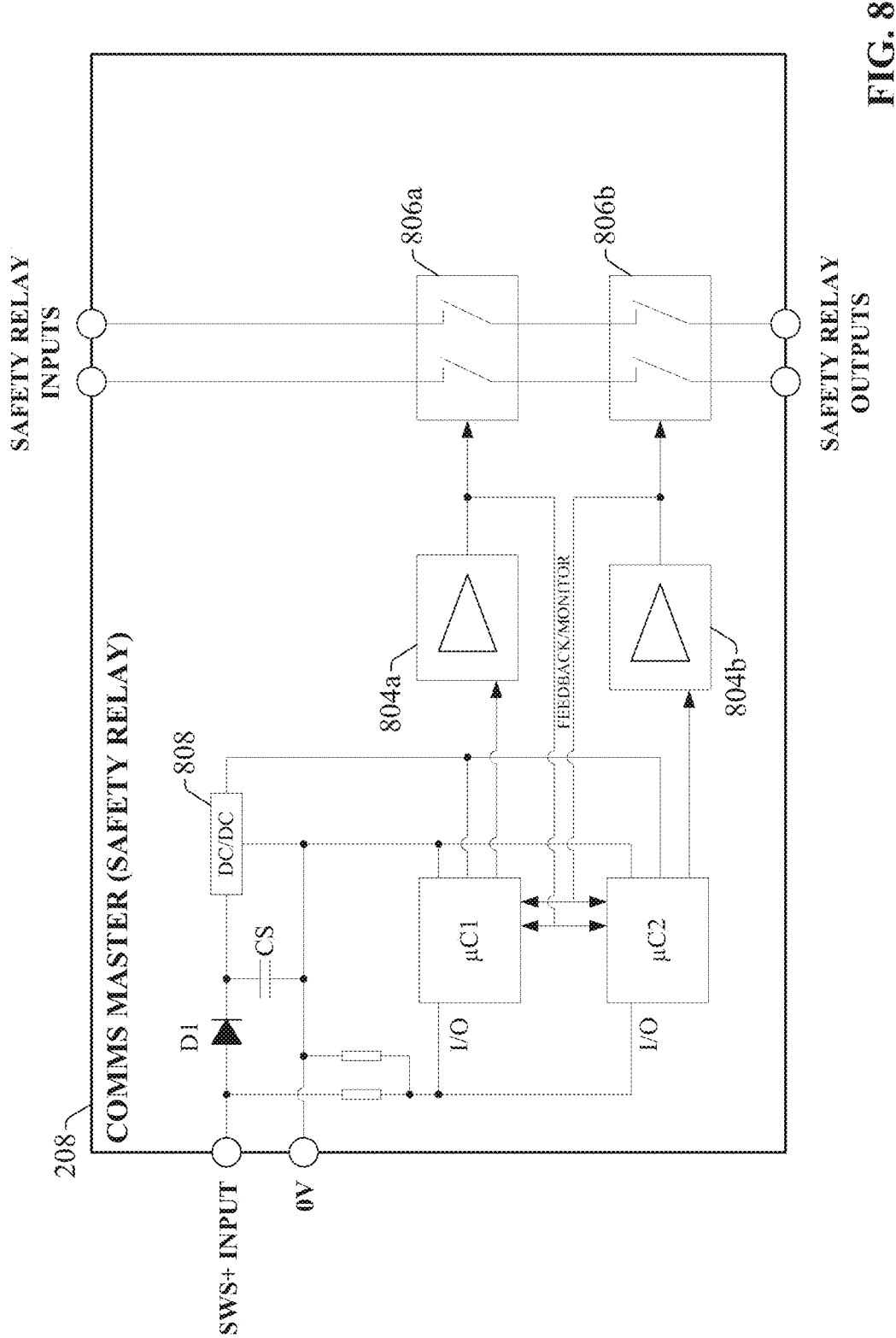
FIG. 8 is an example generalized electrical schematic that can be used to confirm receipt of a defined pulse signal on an SWS+ INPUT terminal of a comms master device.

FIG. 8 is an example generalized electrical schematic that can be used to confirm receipt of the defined pulse pattern on the SWS+ INPUT terminal of the comms master 208. The example schematic can reliably verify the pulse signal using independent redundant verification. For clarity, the circuitry used to control diagnostic and configuration message communication is omitted from FIG. 8, and the illustrated schematic only includes elements for confirming receipt of the defined pulse signal. It is to be appreciated that the schematic depicted in FIG. 8 is only intended to be exemplary, and that any suitable electrical design for controlling safety relay outputs based on presence or absence of a specified pulse pattern is within the scope of one or more embodiments of this disclosure.

The comms master 208 receives the pulsed safety signal via the SWS+ INPUT terminal and splits the received signal between a power storage capacitor CS (e.g., an electrolyte capacitor) and two microcontrollers µC1 and µC2. A DC/DC converter 808 connected to the storage capacitor CS generates a supply power having a supply voltage of 5V from the input 24V pulse train signal. The 0V terminal receives the 0V ground potential. While all safety input devices on the safety circuit are in their respective safe states, comms master 208 is provided with the supply voltage via the diode D1, the storing capacitor CS and the DC/DC converter 808, representing the necessary operating voltage. When powered by the output of the DC/DC converter 808, the microcontrollers µC1 and µC2 are activated. If these microprocessors now additionally detect a valid pulse code at their I/O terminals, the driver units 804a and 804b are controlled to trigger the relay pairs 806a and 806b for providing a switched-on status of the safety relay outputs. Consequently, SWS+ INPUT must receive a voltage different from 0V, which additionally must have a valid pulse pattern in order to cause the comms master 402 to output a valid output signal.

With this safety device topology, it is possible to fulfill the requirements of category 4 of the safety standards using only a single-channel connection. The high safety category is achieved due to the predetermined pulse pattern conveyed on the signal and the two-channel evaluation of this signal using both microprocessors. Furthermore, by feeding back the output signals of the driver units 804a and 804b to both microprocessors in a parallel way, a plausibility check can be performed to ensure fault-free operation of the microprocessors.

When any of the safety devices 204 on the safety circuit transition to the unsafe state (e.g., a light curtain is broken, an emergency stop pushbutton is pressed, etc.), the pulse signal is no longer received at the SWS+ INPUT terminal of the comms master 208, causing relay pairs 806a and 806b to open, thereby disconnecting power from the industrial devices fed by the safety relay outputs. Opening of the safety relay outputs is triggered when either of two criteria is met—when one or both of microcontrollers µC1 and µC2 do not detect a valid pulse pattern on their input terminals, or when the microcontrollers do not receive a supply voltage from DC/DC converter 808. Thus, a failure of one of the microcontrollers, one of the driver units 804a and 804b, or one of the relay pairs 806a and 806b does not prevent safe operation of the comms master 208.

Once a single-wire safety circuit comprising a comms master device 208 and one or more safety devices 204 (including one safety device 204 serving as a safety master) has been established and configured, the safety circuit can enter run mode and commence normal safety operation. FIGS. 9A-9D are block diagrams illustrating safety and diagnostic modes according to one or more embodiments. As shown in FIG. 9A, example single-wire safety circuit 902 comprises a comms master device 208 and five safety devices 204a-204e, where safety device 204a operates in safety master mode and safety devices 204b-204e operate in normal mode. As safety master, safety device 204a generates the pulsed safety signal 206 that is placed on the single-wire safety channel. Prior to operation, the comms master device 208 assigns a unique SWS address to each of the safety devices 204 during a preliminary enumeration stage. In the example depicted in FIG. 9A, the five safety devices 204 are assigned addresses [01]-[05].

During operation mode, during which all safety devices 204a-204e are in their respective operational states, pulsed safety signal 206 is relayed along the single-wire channel by the respective safety devices 204 and received at the SWS+ INPUT terminal of comms master device 208. Each safety device 204 that receives the pulsed safety signal 206 on its SWS+ INPUT terminal during safety mode verifies that the received pulse pattern matches a defined pulse pattern (e.g., pulse signal 302 or another defined pulse pattern). In this regard, each safety device 204 and comms master device 208 can store pulse pattern definition data that defines the expected pulse pattern. This pulse pattern definition data can be referenced by each device and compared with the pattern interpreted as being present in the signal 206. In accordance with the enable block illustrated in FIG. 7, each safety device 204 outputs the pulsed safety signal 206 on its SWS+ OUTPUT terminal if (a) the pulse pattern is confirmed to be the correct pulse pattern, (b) the safety function is valid (e.g., door closed, emergency stop pushbutton disengaged, light curtain unbroken, etc.), (c) there are no internal faults on the safety device 204, and (d) the communication stack for the safety device 204 is active. The pulsed safety signal 206 is thus relayed through the safety devices 204 via the single-wire channel to the SWS+ INPUT terminal of the comms master device 208.

Comms master device 208 detects and verifies that the pulse pattern received on the safety signal 206 matches the defined pulse pattern (e.g., pulse signal 302 or another defined pulse pattern). As long as the defined pulse pattern is recognized on its SWS+ INPUT terminal, comms master device 208 allows its safety contactors 606 to switch to the closed state, providing power to the industrial machines and/or devices connected to its safety relay outputs (Operational mode).

FIG. 9B illustrates a scenario in which safety device 204*d*—corresponding to a door safety switch—switches to its unsafe state (e.g., the corresponding safety door has been opened). Upon switching to the unsafe state, safety device 204*d* stops relaying the pulsed safety signal 206 to the next downstream device on the safety circuit (safety device 204*e*), preventing the pulsed safety signal 206 from reaching the comms master device 208. Upon detecting loss of the safety signal 206, comms master device 208 opens its safety contactors 606 and isolates power from the connected industrial machines and/or devices (Safe State). In addition to blocking the safety signal 206, safety device 204*d* also sets a "last device" (LastDev) flag indicating that it is the last device on the safety circuit capable of receiving the safety signal 206 from the safety master device 204*a*.

Upon detecting loss of the safety signal, comms master device 208 initiates diagnostic mode and begins collecting information from the safety devices 204. The comms master device 208 can retrieve data by addressing specific safety devices 204 starting with device [01] or can send a broadcast address of [FF] to retrieve data from all safety devices 204 on the circuit 902. The following will describe addressing of specific devices 204. As shown in FIG. 9C, comms master device 208 begins by sending a diagnostic message (DIAG) to address [01] (safety device 204*e*) via the single-wire channel (e.g., by outputting the DIAG message on its SWS+ INPUT terminal). The DIAG message (labeled "1" in FIG. 9C) includes the address [01] for which status information is requested. Upon receiving the DIAG message on its SWS+ OUTPUT terminal and determining that the address contained in the DIAG message corresponds to its own address, safety device 204*e* responds by sending a DIAG response message (labeled "2" in FIG. 9C) comprising its address number [01] and diagnostic status data (DATA). Safety device 204*e* outputs this DIAG response message on its SWS+ OUTPUT terminal, sending the response via the single-wire channel.

The diagnostic status data sent by the safety device 204*e* can comprise any suitable diagnostic information available on the safety device 204*e*, including at least the value of the safety device's LastDev flag. For example, the diagnostic data may comprise a pre-formatted status word divided into pre-defined status bits and registers, where the values of the bits and registers are set by status word control component 516. Since safety device 204*e* is still in its safe state, its LastDev flag has not been set. Accordingly, the DIAG response message from safety device 204*e* reports a value of LastDev=FALSE. The DIAG response message can also include other status and fault information for the safety device in addition to the LastDev flag. This can include both error codes that are common to all SWS safety devices 204 as well as device-specific status and fault information. Example device-specific status information that can be included in the DIAG response message can include, but is not limited to, door open and closed status (for door safety switches), beam on and off statuses and beam strength warnings (for light curtains), button on and off statuses (for emergency stop pushbuttons and pull-cords), or other such information.

Upon receiving this DIAG response message and determining that safety device 204*e* is not the last available device on the circuit (based on the value of the LastDev flag), comms master device 208 next sends a DIAG message to address [02] (corresponding to safety device 204*d*), as shown in FIG. 9D. Safety device 204*e* receives this DIAG message on its SWS+ OUTPUT terminal and, in response to determining that the address contained in the message does not match its own address, relays the DIAG message to the next upstream device (safety device 204*d*) by outputting the DIAG message on its SWS+ INPUT terminal. Safety device 204*d* responds with a response DIAG message including its address [02] and diagnostic data including at least the value of its LastDev flag (LastDev=TRUE). This DIAG response message is relayed to comms master device 208 via safety device 204*e*, informing the comms master device 208 that the safety device addressed [02] is the last accessible device on the safety circuit. Based on this information, comms master device 208 determines that safety device 204*d* is in its unsafe state, and can report this information to the user (e.g., via a display indication, by sending a notification to a mobile device of a specified user, etc.). In some embodiments, comms master device 208 can also retrieve information about the identified safety device 204 from device identification information previously retrieved and registered by the comms master device 208 and provide this information to the user as well. For example, based on the registered device information, comms master device 208 knows that the safety device 204 corresponding to address [02] is a safety door switch, and therefore the unsafe state corresponds to a detected door open status. The comms master device 208 can therefore generate a notification that the unsafe state is due to the safety door corresponding to safety input device [02] being open.

Once the last safety device 204 capable of receiving the safety signal from the safety master device 204*a* is found (that is, once the device whose LastDev flag is set to TRUE is identified), the comms master device 208 will then send the next DIAG message request. The comms master device 208 will only send DIAG messages to safety devices 204 up to the device 204 that is blocking the safety signal, mitigating unnecessary polling of active devices 204 between the safety master device 204*a* and the safety device 204*d* responsible for blocking the safety signal.

While the comms master device 208 places the monitored industrial system in the safe state due to safety device 204*d* being in its unsafe state, safety master device 204*a* continues to send the pulsed safety signal 206 along the single-wire channel. However, the safety signal 206 will only be relayed as far as the SWS+ INPUT terminal of safety device 204*d*. Upon returning to its operational state (when the safety door corresponding to safety device 204*d* has been closed), safety device 204*d* will detect the pulsed safety signal 206 on its SWS+ INPUT terminal and resume relaying the safety signal 206. If safety device 204e has not entered its unsafe state, it will relay the pulsed signal 206 to the comms master device 208. Subsequently, comms master device 208 detects the safety signal 206 on its SWS+ INPUT terminal and switches operational mode back to ON, allowing the safety contactors 606 to be closed and power to be provided on the safety relay outputs.

Figure 10C:
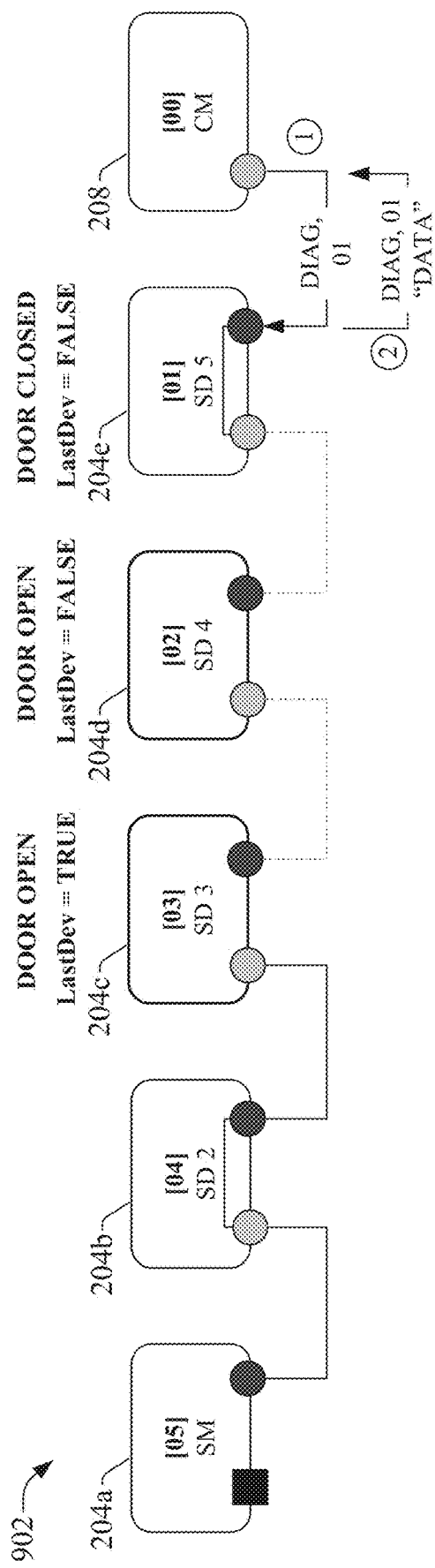

FIGS. 10A-10F are block diagrams illustrating how messaging is performed in a scenario in which multiple safety devices 204 switch to their unsafe states due to their doors being opened. Initially, the safety circuit 902 is operating in operational mode, wherein all safety devices 204a-204e are in their respective operational states and are relaying the pulsed safety signal 206 to comms master device 208, as shown in FIG. 10A. The safety door corresponding to safety device 204d is then opened, followed by the safety door corresponding to safety device 204c, as shown in FIG. 10B. When safety device 204d switches to its unsafe state, it initially sets its LastDev flag to TRUE, as described above in the previous example. However, when safety device 204c subsequently switches to its unsafe state and ceases relaying the safety signal, safety device 204d detects the loss of the safety signal on its SWS+ INPUT terminal and resets its LastDev flag to FALSE. Meanwhile, safety device 204c sets its LastDev flag to TRUE. In general, a given safety device 204 sets its LastDev flag to TRUE if (a) the safety device is in its unsafe state, and (b) if the safety device 204 still detects the safety signal on its SWS+ INPUT terminal. When these two conditions are true, the safety device 204 becomes aware that it is the last safety device 204 capable of receiving the safety signal and sets its LastDev flag to TRUE.

Figure 10D:
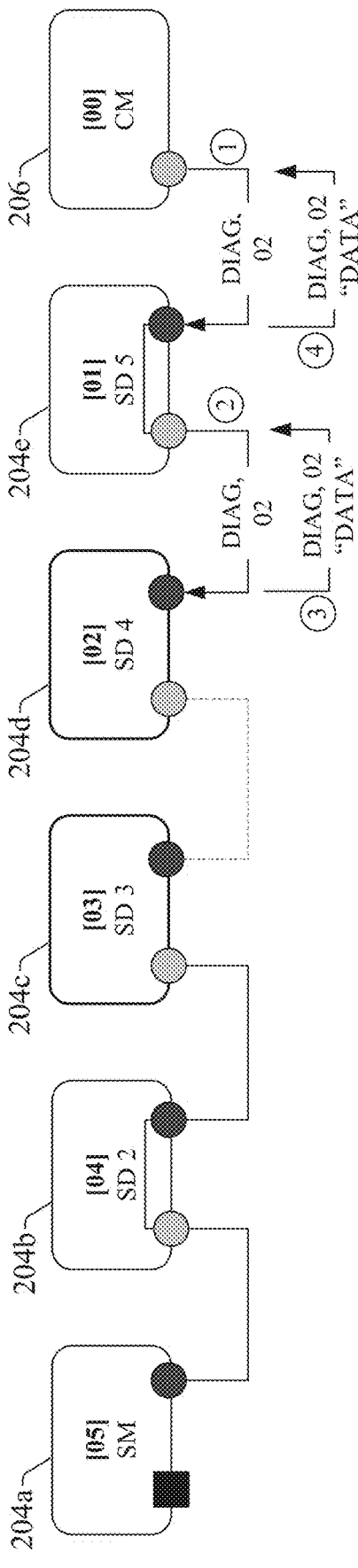
Figure 10E:
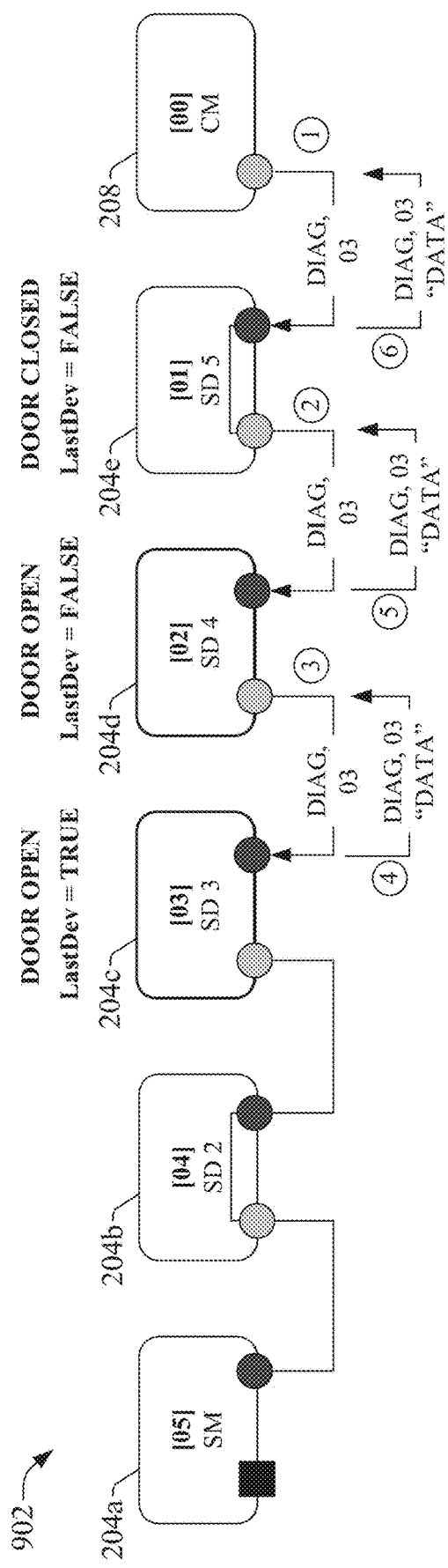

When the comms master device 208 switches from the operational state to the safe state (by opening its safety contactors 606) in response to safety device 204d switching to its unsafe state, comms master device 208 begins polling the safety devices 204 for diagnostic information either by sending a broadcast message or by asking each safety device 204 individually in a round robin manner for information as shown in FIG. 10C. The illustrated example assumes that the comms master device 208 polls the devices individually; however, a broadcasting technique may also be used. Safety device 204e reports a value of LastDev=0 (FALSE), so comms master device 208 waits for more responses, as shown in FIG. 10D. Although safety device 204d (corresponding to address [02]) is in its unsafe state, it is not the last device capable of receiving the safety signal generated by safety master device 204a, and therefore reports Last-Dev=0 (FALSE). Accordingly, comms master device 208 proceeds to poll address [03], which reports LastDev=1 (TRUE), as shown in FIG. 10E. At this stage, comms master device 208 reports the statuses of safety devices 204c, 204d, and 204e (e.g., doors open or doors closed).

Upon determining that safety device 204c is the stopping point for the safety signal, comms master device 208 will continue to send DIAG requests to safety devices 204e, 204d, and 204c. If safety devices 204a or 204b enter the unsafe state, they too will begin to respond to the requests and the LastDev=TRUE indicator will move to the safety device 204 closest to the safety master device 204a with a door open.

Figure 10F:
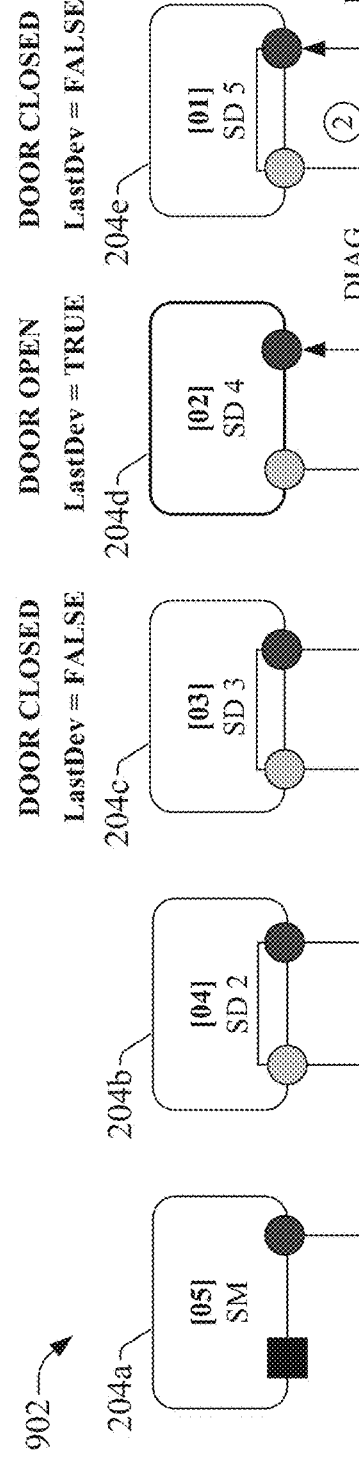

When the safety door corresponding to safety device 204c is closed, as shown in FIG. 10F, safety device 204c replies to the next diagnostic request with its Safety Signal Enable SSE=TRUE. Safety devices 204d and 204e relay this message untouched to the comms master device 208. In addition, safety device 204d sends a confirmation message back to safety device 204c acknowledging receipt of the SSE=TRUE bit. Safety device 204c will then resume relaying the safety signal 206. Meanwhile, since safety device 204d is still in its unsafe state (door open) but now detects the presence of the safety signal 206 on its SWS+ INPUT terminal, that device sets its LastDev flag to TRUE. Consequently, upon receipt of the next DIAG message, safety device 204d sends a DIAG response message that includes a value of LastDev=TRUE, and will not attempt to relay the message upstream. The comms master device 208 continues to send DIAG requests until all safety devices 204 have sent their SSE=TRUE bits in their diagnostic message responses, been confirmed, and the safety signal 206 is relayed to the comms master device 208.

The foregoing examples describe a number of message types that can be exchanged between SWS safety devices 204 and comms master devices 208 via the single-wire safety channel. Some embodiments of the SWS devices 204 and 208 described herein may support additional types of messaging. For example, in one or more embodiments, the comms master device 208 may be configured to send remote restart commands to selected safety devices 204 via the single-wire channel. These remote restart commands may include the address of the safety device 204 to be restarted, such that when the targeted device 204 receives the command on its SWS+ OUTPUT terminal and verifies the matching address, the safety device 204 will initiate a restart sequence.

As described in the foregoing examples, the safety input device 204a designated as the safety master modulates the safety signal 206 according to a defined pulse pattern (e.g., the pulse pattern depicted in FIG. 3), and this safety signal 206 is relayed from the safety master device 204a to the comms master over the single-wire channel In some embodiments, one or more additional pulse patterns can be defined for use by the safety system devices for other purposes. For example, two different pulse patterns may be defined to convey respective two different types of safety states (e.g., a "doors closed" state and a "doors locked" state). The comms master device 208 can be configured to recognize which of the defined patterns is present on the single-wire channel and operate in accordance with the particular unsafe state corresponding to the detected pulse pattern (which may depend on user-defined programming downloaded to the comms master device 208). For example, the comms master device 208 may be programmed to only enable a defined subset of its safety relay outputs if a first defined pattern is detected (e.g., a pattern corresponding to a "doors closed but unlocked" state), and to enable the remaining safety relay outputs if the second defined pattern is detected (corresponding to a "doors closed and locked" state).

Although the example single-wire safety circuits described above have assumed a comms master device 208 having a single SWS+ INPUT terminal for connection to a single safety channel, some embodiments of the comms master device 208 may support monitoring of two or more single-wire channels. FIG. 11 is a diagram illustrating a SWS+ safety circuit 1102 comprising a comms master device 208 that monitors safety devices 204 on two single-wire channels. In such embodiments, the comms master device 208 can include two SWS+ INPUT terminals for connection to the respective single-wire channels, allowing safety devices 204 to be segregated into zones. In the illustrated example, safety devices 204aa-204ae reside on a first single-wire channel and comprise a first zone (Zone 1), while safety devices 204*ba*-204*bb* reside on a second single-wire channel and comprise a second zone (Zone 2). Similar to previous examples, each safety channel includes a safety master (204*aa* for Zone 1 and 204*ba* for Zone 2) that generates a pulsed safety signal (206*a* and 206*b* for Zones 1 and 2, respectively), with each safety master device 204*aa* and 204*ba* generating its safety signal independently of the other.

If the same pulse pattern is used for each of the pulsed safety signals 206*a* and 206*b*, there exists a possibility that an inadvertent short-circuit across the two SWS+ INPUT terminals of the comms master device 208 may prevent the comms master device 208 from transitioning to a safe state even if a safety device 204 on one of the two channels stops conveying the safety signal 206 on that channel, since the comms master device 208 will still recognize the pulse pattern received from the other channel on both of its shorted SWS+ INPUT terminals. Therefore, to ensure that a short-circuit across the two SWS+ INPUT terminals on the comms master device 208 does not prevent the comms master device 208 from reacting to an unsafe condition on one of the channels, the two safety masters 204*aa* and 204*bb* can be configured to generate respective two different pulse patterns that are uniquely identifiable by the comms master device 208.

To achieve this, a stage can be added to the startup mode sequence whereby the comms master device 208 instructs the safety devices 204 on each channel which predefined safety signal pattern is to be used by that channel. For example, each SWS+ safety device 204 may be preconfigured to recognize one of multiple pre-defined pulse patterns. During the safety system's startup sequence, the comms master device 208 can designate one of the pre-defined pulse patterns to each of the two channels, selecting different patterns for each channel. At a defined phase of the startup sequence, the comms master device 208 can send a configuration message that includes an identifier of the selected pattern to the safety devices 204 via the single-wire channel.

Upon receipt of this configuration message, each safety device 204 will self-configure to begin operating in accordance with the selected pulsed safety signal. For example, the respective safety masters 204*aa* and 204*ba* will use the specified pulse patterns for generation of the pulsed safety signals 206*a* and 206*b*. The other safety devices 204 on each channel—having also been provided with the identification of the pulse pattern designated to that channel by the comms master device 208—will only recognize the designated pulse pattern as the valid safety signal for that channel. The comms master device 208 will only assume that a given channel is in the safe state if the pulse pattern designated for that channel is recognized on the SWS+ INPUT terminal for that channel In this way, a short-circuit across the two SWS+ INPUT terminals of the comms master device 208 will cause the comms master device 208 to see an incorrect pulse pattern on one of the SWS+ INPUT terminals, causing the comms master device 208 to switch to safety mode until the short-circuit is removed.

Figure 12:
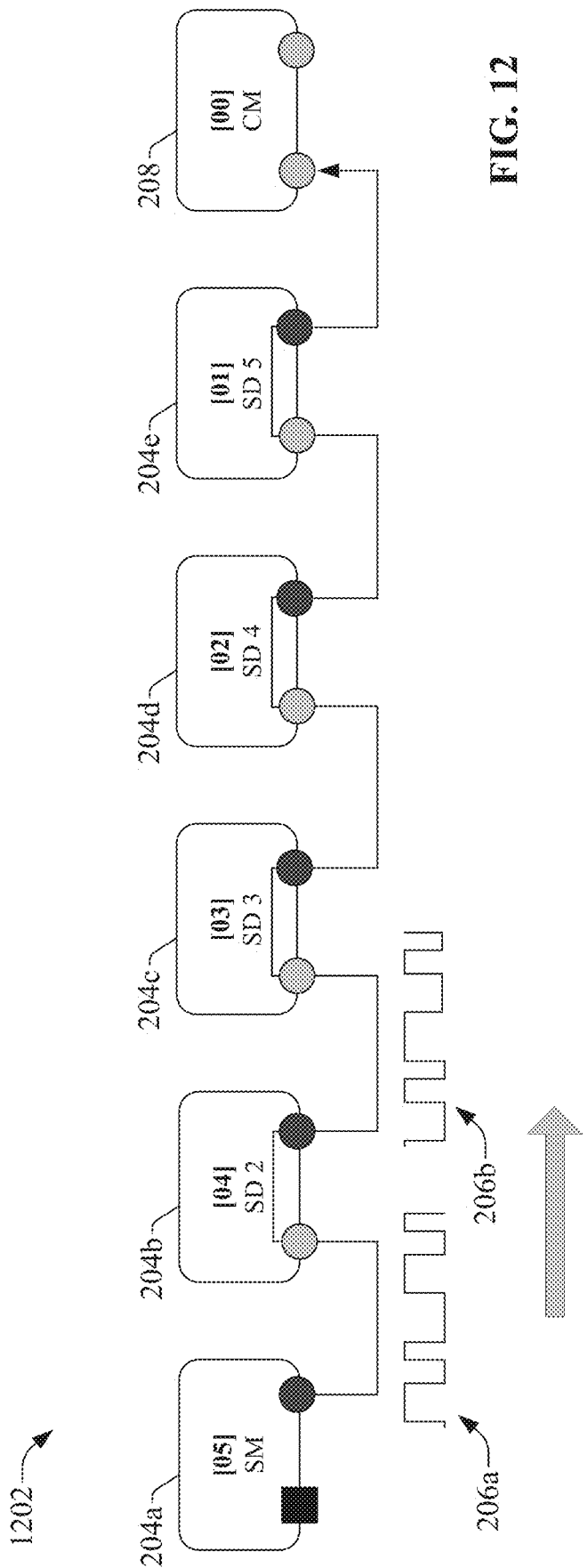
FIG. 12 is a diagram illustrating a SWS+ safety circuit that includes safety devices that invert a safety signal.

It is also recognized that short-circuits across the SWS+ INPUT and SWS+ OUTPUT terminals of a given safety device 204 can also cause safety issues, since this may cause a safety signal received at the SWS+ INPUT terminal to always be passed to the device's SWS+ OUTPUT terminal, even if the safety device 204 is not in a safe state. To mitigate this possibility, one or more embodiments of the SWS+ safety devices 204 can be configured to invert the pulsed safety signal 206 received on its SWS+ INPUT terminal prior to outputting the safety signal on its SWS+ OUTPUT terminal. FIG. 12 is a diagram illustrating a SWS+ safety circuit 1202 that includes safety devices 204 that invert the safety signal in this manner In these embodiments, a stage can be added to the startup sequence of the safety circuit 1202 whereby the devices on the safety circuit negotiate as to which devices will be configured to recognize the non-inverted pulse pattern (that is, the pattern generated by safety master device 204*a*) as the valid safety signal 206, with the remaining devices being configured to recognize the inverted version of the pulsed pattern as the valid safety signal 206. This negotiation is designed to ensure that every other device on the circuit—beginning with the safety device 204*b* that is adjacent to the safety master device 204*a*—is configured to recognize the non-inverted signal 206*a*, with the other devices on the circuit being configured to recognize the inverted signal 206*b*.

During operation, safety device 204*b*—which is adjacent to the safety master device 204*a* and configured to receive the non-inverted signal—receives pulsed safety signal 206*a* from safety master device 204*a* on its SWS+ INPUT terminal, and recognizes this non-inverted pattern as the valid safety signal. If safety device 204*b* is not currently in safe mode, the safety device 204*b* will invert this received pattern and send the inverted pattern as safety signal 206*b* on its SWS+ OUTPUT terminal. Safety device 204*c*—which is configured to recognize the inverted pattern as the valid safety signal—receives this inverted signal 206*b* and likewise inverts the pattern again prior to outputting the signal on its SWS+ OUTPUT terminal (yielding the original non-inverted signal). This procedure continues through all the safety devices 204 (assuming none are in safe mode) until the signal reaches the comms master's SWS+ INPUT terminal.

The version of the signal recognized by the comms master device 208 as the valid safety signal will depend on the number of safety devices 204 on the circuit 1202. For example, if the comms master device 208 identifies that there are an even number of safety devices 204 on the circuit, the comms master device 208 will configure itself during startup to recognize the inverted pattern as the valid signal, whereas if there is an odd number of safety devices 204 on the circuit 1202, the comms master device 208 will configure itself to recognize the non-inverted pattern as the valid signal.

In accordance with the general operation of the example SWS+ safety systems described above, the designated safety master device 204*a* generates a defined pulse pattern and outputs the pattern as a safety signal 206 on the single-wire channel. As long as all safety devices 204 on the channel are in their respective safe states (that is, there is no demand on the safety devices 204), the safety signal 206 is relayed by the safety devices 204 in turn until the signal 206 reaches a safety relay device acting as the comms master device 208 for the single-wire safety circuit. If any of the safety devices 204 detects an unsafe condition (e.g., a light broken light curtain, an emergency stop button pressed, a safety mat activated, an emergency pull cord pulled, etc.), that safety device 204 ceases relaying the safety signal 206, preventing the safety signal 206 from reaching the comms master device 208. When the comms master device 208 detects absence of the safety signal 206, the safety contactors 606 of the comms master device 208 are opened to remove power from the protected system, and the comms master device 208 begins sending requests for diagnostic information (DIAG messages) to each safety device 204 in turn via the single-wire channel. Each safety device 204 responds to its received request by sending the requested diagnostic information via the single-wire channel. This general operation is described above in connection with FIGS. 9A-9D.

In these foregoing examples, after the safety circuit has entered run mode, diagnostic information originating from the safety devices 204 is only sent to the comms master device 208 via the single-wire channel in response to a request from the comms master device 208 for such information, and only after the pulsed safety signal 206 has stopped transmitting on the single-wire channel. That is, in the embodiments described above, data originating from the safety devices 204 is only available to the comms master device 208 while the system is in the safe state, while the safety signal 206 is not being conveyed on the single-wire channel.

Some other embodiments of the SWS+ safety system can also be configured to allow safety devices 204 on the safety circuit to send data to the comms master device 208 via the single-wire channel while the safety system is in the normal operating state; that is, while the pulsed safety signal 206 is still being relayed to the comms master device 208. This allows the safety devices 204 to report prognostic data or other types of information to the comms master device 208 without waiting for the safety devices 204 to transition to their unsafe state. In such embodiments, data messages sent by a safety device 204 during normal operation of the safety circuit will typically not relate to the safe or unsafe state of the safety device 204, but rather to non-critical prognostic or warning information relating to the safety device 204 that may warrant attention by an operator or technician (e.g., high temperature warnings, warnings that the number of operating cycles for the safety device 204 is approaching the rated lifespan of the safety device, etc.) but are not indicative of an immediately unsafe condition.

Figure 13A:
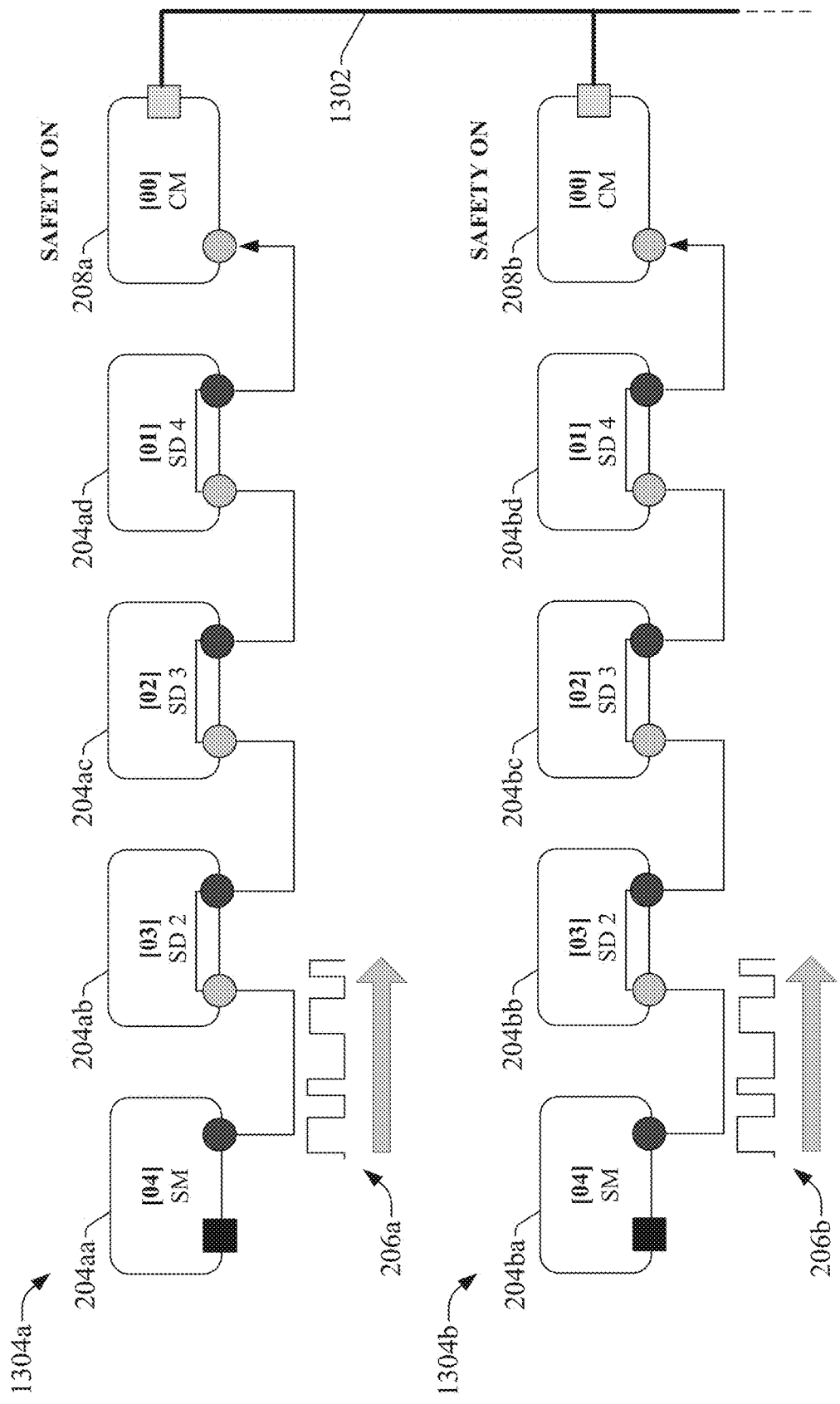

As noted above, some embodiments of the SWS+ safety devices 204 and comms master device 208 can support broadcasting of a global emergency stop (e-stop) to other SWS+ safety circuits such that detection of an unsafe condition on a safety device 204 of a first safety circuit not only causes the comms master device 208 that monitors that safety circuit to transition to its safe state (that is, to open its safety contactors 606 and isolate power from its locally connected hazardous machines), but also causes a comms master device 208 of one or more other safety circuits to enter their safe states. FIG. 13A is a diagram illustrating an example architecture in which two independent safety circuits 1304a and 1304b are communicatively connected via a network 1302. As in previous examples, each safety circuit 1304a and 1304b comprises a comms master device 208 and a series of safety devices 204 that relay a safety signal 206 to the comms master device 208 over a single-wire channel, the safety signal 206 being generated by the safety device at the end of the circuit acting as a safety master (safety device 204aa for safety circuit 1304a and safety device 204ba for safety circuit 1304b).

Additionally, each comms master device 208 includes a networking component 414 that allows the comms master devices 208a and 208b to be communicatively connected via a network 1302. Network 1302 may be, for example, and Ethernet network, an EthernetIP network, a common industrial protocol (CIP) network, or network compliant with another networking protocol. Although only two safety circuits 1304a and 1304b are depicted as being networked together in FIG. 13A, it is to be appreciated that any number of comms master devices 208—and a corresponding number of safety circuits 1304—can be communicatively connected via network 1302. In an example implementation, the different safety circuits 1304a and 1304b can monitor safety devices 204 associated with respective different production areas or machines, and the comms master device 208 of each safety circuit 1304 can be configured to disconnect power to hazardous equipment associated with that circuit's monitored production area or machine in the event of a safety event detected by a safety device 204 on that circuit, as described in previous examples.

In the scenario depicted in FIG. 13A, all safety devices 204 of both safety circuits 1304a and 1304b are in their respective operational states (that is, no safety inputs have been tripped). Consequently, the pulsed safety signals 206a and 206b are relayed along the respective single-wire safety channels by the safety devices 204 (devices 204aa-204ad in circuit 1304a, and devices 204ba-204bd in circuit 1304b) and received at the SWS+ INPUT terminals of the respective comms master devices 208a and 208b.

According to one or more embodiments, a safety device 204 can be configured to initiate either a "local" e-stop that only applies to the local comms master device 208 that monitors the safety circuit 1304 on which the safety device 204 resides, or a "global" e-stop that is also broadcast to other comms master devices 208 on the network 1302, causing all comms master devices 208 on the network 1302 (or a selected subset of the comms master devices 208) to open their safety contactors 606 and disconnect power to their respective sets of hazardous equipment. In various embodiments, a safety device 204 can be set to issue either a local or a global e-stop using a hardware configuration switch on the safety device 204, or by configuring a configuration parameter (e.g., an "E-stop Type" parameter) stored on the safety device 204 using a software configuration tool that executes on a client device. Global e-stops may be beneficial in scenarios in which a first production area monitored by a first safety circuit 1304a is dependent on the activity of a second production area monitored by a second safety circuit 1304b, such that a potentially hazardous scenario in one production area necessitates placing both production areas in a safe state.

Setting a safety device 204 to act as a global e-stop device can cause a Global flag or parameter stored on the safety device 204 to be set to TRUE. For safety devices 204 that have been configured as local e-stop devices, the Global flag will be set to FALSE. By allowing safety devices 204 to be individually configured to serve as either a local e-stop device or a global e-stop device, a safety circuit 1304 can be designed to include safety devices 204 that are all configured as either global e-stops or local e-stops, or can be designed to include a set of safety devices 1304 that includes both local and global e-stop devices depending on the requirements of the safety application. For example, a system designer may specify that a safety device 204aa that monitors the state of a safety pull cord need only cause power to be disconnected from the local automation system monitored by that safety device's safety circuit 1304a (i.e., a local e-stop function), while another safety device 204ac on the same safety circuit 1304a that monitors the state of an e-stop push button should cause power to be disconnected from both the locally monitored automation system and another automation system monitored by a second safety circuit 1304b.

FIG. 13B illustrates a scenario in which safety device 204ac on a first safety circuit 1304a switches to its unsafe state. In this example, safety device 203ac monitors the state of an e-stop pushbutton, and so the safety device 204ac switches to its unsafe state upon detecting that the e-stop pushbutton has been pressed. Safety device 204ac has previously been configured to act as a global e-stop device, and consequently the Global flag stored on the safety device 204*ac* is set to TRUE.

As described in previous examples, upon switching to its unsafe state (e.g., due to the e-stop button being pressed), safety device 204*ac* stops relaying the pulsed safety signal 206 to the next downstream device (safety device 204*ad*) on the safety circuit 1304*a*, preventing the pulsed safety signal 206*a* from reaching the comms master device 208*a*. Upon detecting loss of the safety signal 206*a*, comms master device 208 opens its safety contactors 606 and isolates power from industrial machines and/or devices that are protected by the safety circuit 1304*a* (Safety Off state). In addition to blocking the safety signal, safety device 204*ac* also sets its LastDev flag indicating that it is the last device on the safety circuit 1304*a* capable of receiving the safety signal 206*a* from the safety master device 204*aa*.

Figure 13C:
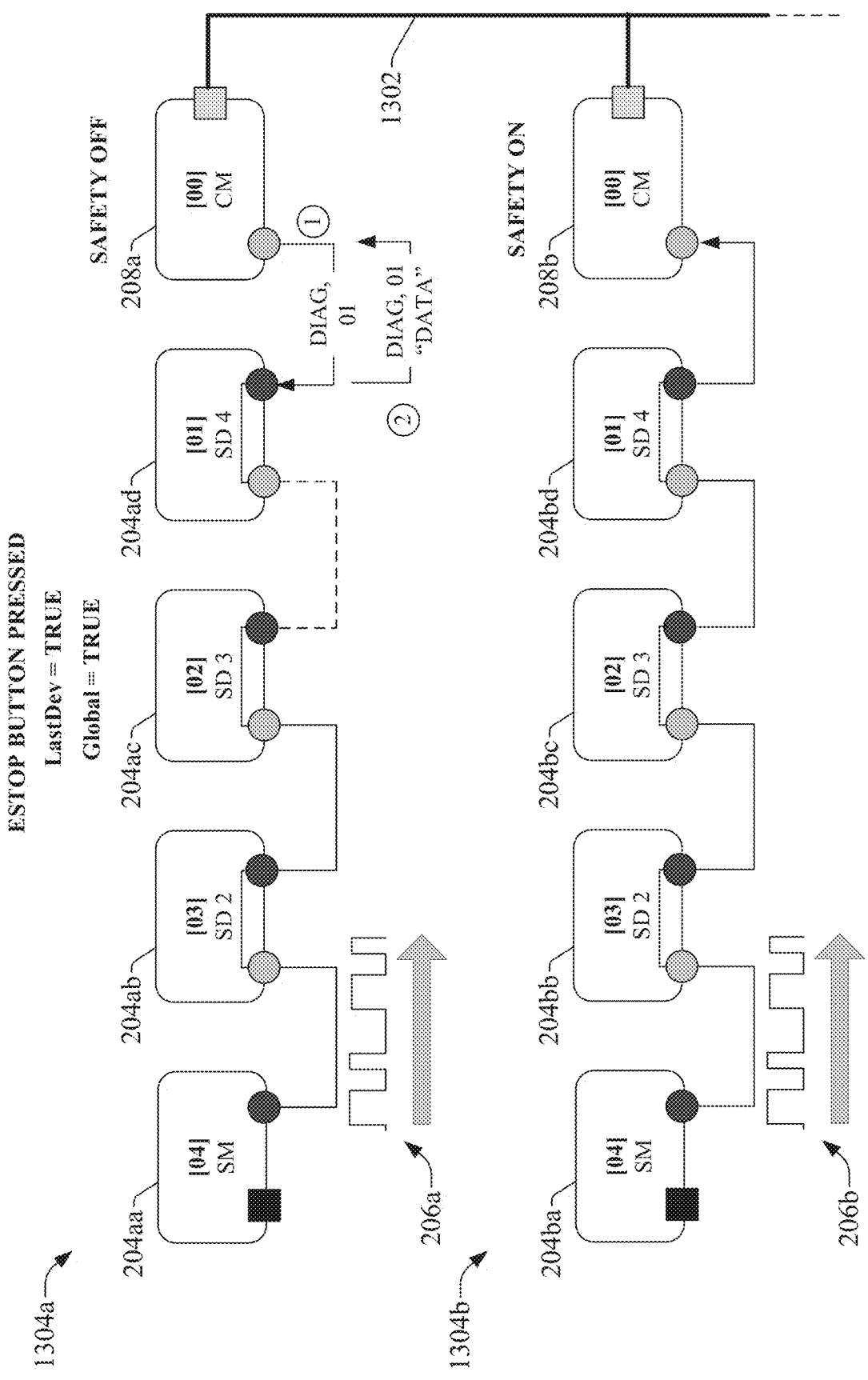

Similar to previous examples, upon detecting loss of the safety signal 206*a*, comms master device 208*a* initiates diagnostic mode and begins collecting information from the safety devices 204 on circuit 1304*a*. As shown in FIG. 13C, comms master device 208*a* begins by sending a diagnostic message (DIAG) to address [01] (safety device 204*ad*) via the single-wire channel (e.g., by outputting the DIAG message on its SWS+ INPUT terminal). The DIAG message (labeled "1" in FIG. 13C) includes the address [01] of the safety device 204*ad* for which status information is requested. Upon receiving the DIAG message on its SWS+ OUTPUT terminal and determining that the address contained in the DIAG message corresponds to its own address, safety device 204*ad* responds by sending a DIAG response message (labeled "2" in FIG. 13C) comprising its address number [01] and diagnostic status data (DATA). Safety device 204*ad* outputs this DIAG response message on its SWS+ OUTPUT terminal, sending the response via the single-wire channel.

As described above in connection with the example depicted in FIGS. 9A-9D, the diagnostic status data sent by the safety devices 204 can comprise any suitable diagnostic information available on the safety devices 204, including at least the value of the safety device's LastDev flag. In some embodiments, the diagnostic data may comprise a pre-formatted status word divided into pre-defined status bits and registers, where the values of the bits and registers are set by status word control component 516. Since safety device 204*ad* is still in its normal operating state (that is, the safety input being monitored by safety device 204*ad* has not been tripped), its LastDev flag has not been set. Accordingly, the DIAG response message from safety device 204*ad* reports a value of LastDev=FALSE.

In the present example, the DIAG response messages generated by the safety devices 204 can also include an indication of whether the safety device 204 is configured to operate as a normal, local e-stop device (Global=FALSE) or as a global e-stop device (Global=TRUE). Accordingly, safety device 204*ad* includes the value of its Global flag (TRUE or FALSE) as part of its DIAG response message. However, since safety device 204*ad* is not currently in its unsafe state (since the safety function implemented by safety device 204*ad* is currently valid) and consequently is not reporting an e-stop condition, the comms master device 208*a* disregards the state of that safety device's Global flag. In some embodiments, comms master device 208*a* may disregard the value of a safety device's Global flag if that safety device's LastDev parameter is set to FALSE.

Figure 13D:
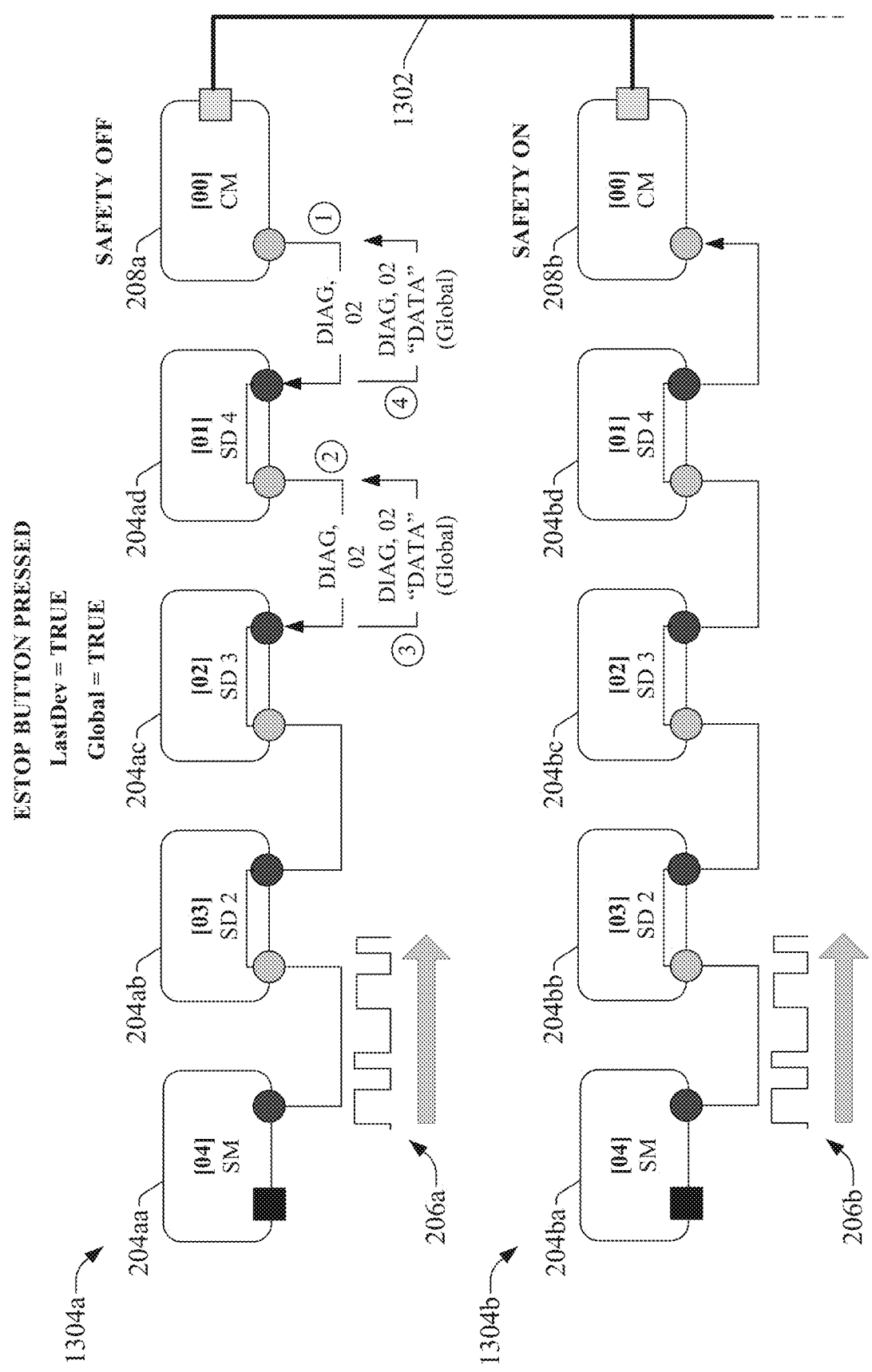

Upon receiving this DIAG response message from safety device 204*ad* and determining that safety device 204*ad* is not the last available device on the safety circuit 1304*a* (based on the value of the safety device's LastDev flag), comms master device 208*a* next sends a DIAG message to address [02]—corresponding to safety device 204*ac*—as shown in FIG. 13D (labeled as step 1). Safety device 204*ad* receives this DIAG message on its SWS+ OUTPUT terminal and, in response to determining that the address contained in the message does not match its own address, relays the DIAG message to the next upstream device (safety device 204*ac*) by outputting the DIAG message on its SWS+ INPUT terminal (step 2). Safety device 204*ac* responds with a response DIAG message (step 3) including its address [02] and diagnostic data including at least the value of its LastDev flag (LastDev=TRUE) and the value of its Global flag (Global=TRUE). This DIAG response message is relayed to comms master device 208*a* via safety device 204*ad* (step 4), informing the comms master device 208*a* that the safety device addressed [02] is the last accessible safety device on the safety circuit. As noted above, safety device 204*ac* will report its Global flag as being set to TRUE based on its current configuration as a global e-stop device (which can be set using a hardware switch or using device configuration software).

Based on this information, comms master device 208*a* determines that safety device 204*ac* is in its unsafe state (that is, the safety function implemented by safety device 204*ac* has been invalidated by pressing the e-stop pushbutton), and can report this information to the user (e.g., via a display indication, by sending a notification to a mobile device of a specified user, etc.). In some embodiments, comms master device 208*a* can also retrieve information about the identified safety device 204*ac* from device identification information previously retrieved and registered by the comms master device 208*a* and provide this information to the user as well. For example, based on the registered device information, comms master device 208*a* knows that the safety device 204*ac* corresponding to address [02] is an e-stop pushbutton, and therefore the unsafe state corresponds to a detection that the e-stop pushbutton has been pressed. The comms master device 208*a* can therefore generate a notification that the unsafe state is due to the e-stop pushbutton corresponding to safety input device [02] being open.

Figure 13E:
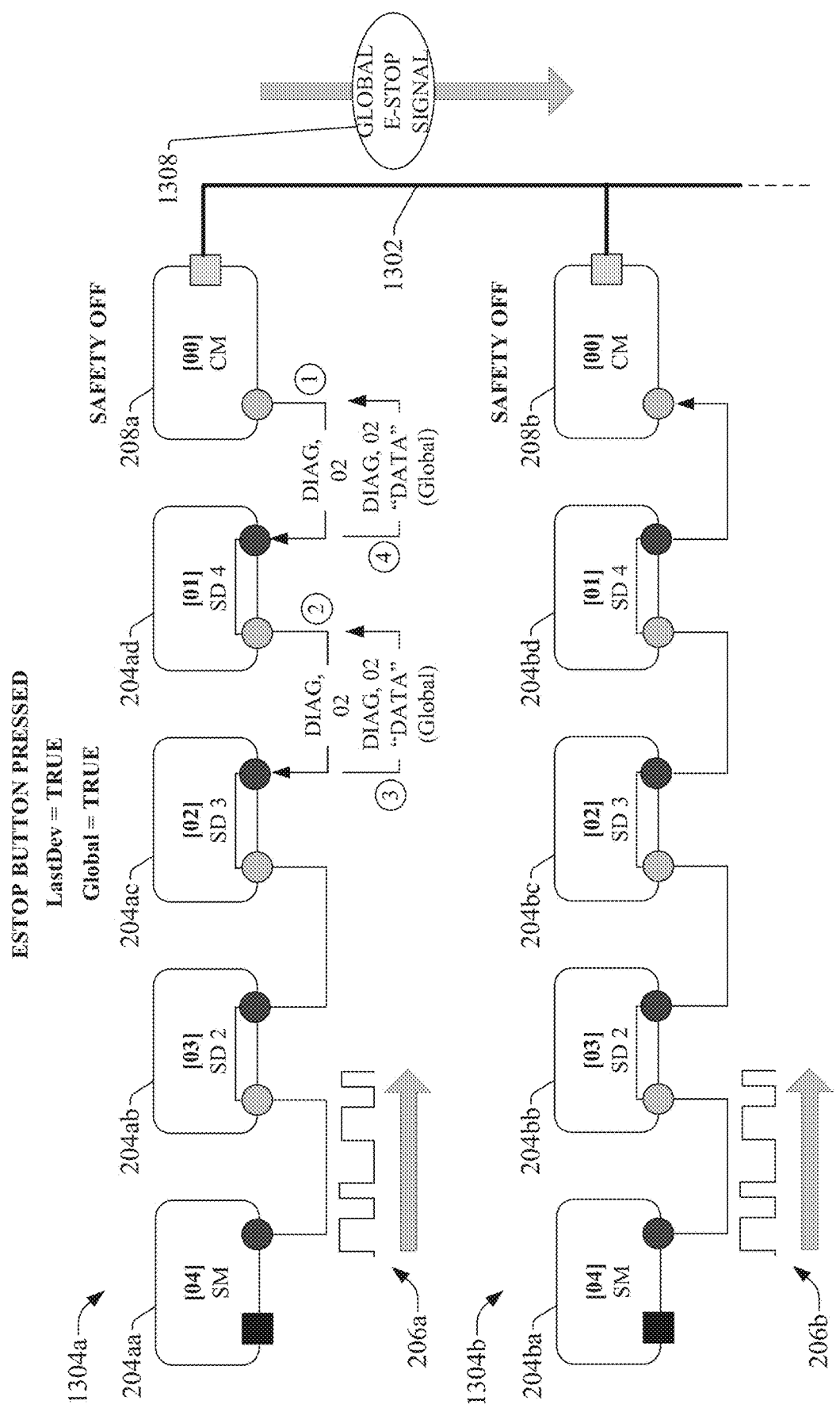

As shown in FIG. 13E, when the DIAG response message from safety device 204*ac* is received at the comms master device 208*a*, the message processing component 412 of the comms master device 208*a* reads the value of the Global flag contained in the response message. In response to determining that the value of the safety device's Global flag is TRUE, the global e-stop component 416 of the comms master device 208 generates a Global E-stop signal 1308 directed to the other comms master devices 208 on network 1302 (e.g., comms master device 208*b*) and sends this Global E-stop signal 1308 over the network 1302. The Global E-stop signal 1308 can be sent over the network 1302 using CIP messaging protocol or another suitable messaging protocol.

Upon receipt of the Global E-stop signal 1308 via the network 1302, comms master device 208*b* (and any other comms master device 208 on the network) will switch to its safe state by opening its safety contactors 606 even though that comms master device 208*b* is still receiving its corresponding safety signal 206*b*. Thus, detection of a global e-stop event on a first safety circuit 1304*a* causes all comms master devices 208 (e.g., comms master devices 208*a* and 208*b*) to transition to their safe states, disconnecting power to the hazardous equipment being protected by those comms master devices.

Although FIG. 13E depicts the Global E-stop signal 1308 as comprising a network message that is generated and broadcast by the originating comms master device 208a to other comms master devices 208 on the network 1302, other approaches for sharing a global e-stop signal between comms master devices 208 are also within the scope of one or more embodiments. For example, in some embodiments each comms master device 208 may store a Global E-stop register whose value is continually monitored by the other comms master devices 208 over network 1302. If a given comms master device 208 is not currently experiencing a global e-stop condition, that comms master device 208 writes a FALSE value to its Global E-stop register. Since this value is monitored by the other comms master devices 208 over network 1302, a FALSE value in the Global E-stop register informs the other comms master devices 208 of the absence of a global e-stop condition originating from that comms master device 208. When the given comms master device 208 receives a DIAG response message from one of its safety devices 204 configured as a global e-stop device, the value of the Global E-stop register switches to TRUE. Upon reading this TRUE value in the comms master device's Global E-stop register, the other comms master devices 208 on the network 1302 switch to their safe states (e.g., by opening their safety contactors 606).

The global e-stop component 416 of the comms master device 208 is responsive to Global E-stop instructions from other comms master devices 208 on the network 1302. For example, the global e-stop component 416 can monitor the network 1302 for receipt of a Global E-stop signal 1308, or can monitor the Global E-stop registers on the other comms master devices 208 over the network. In response to receiving a Global E-stop signal 1308 or detecting that a global e-stop register on another comms master device 208 has been updated to indicate a global e-stop condition, the global e-stop component 416 can instruct the relay control component 406 to place the safety contactors 606 of the comms master device 208 in their safe state (e.g., by opening the contactors 606).

Since safety devices 204 can be selectively pre-configured to act as either local or global e-stop devices, each safety circuit 1304 can be configured to support both local e-stop events that only cause its local comms master device 208 to switch to its safe state as well as global e-stop events that cause all comms master devices 208 on the network 1302 to switch to their respective safe states. The selection of local or global e-stop devices to be included on a given safety circuit 1304 can depend on the requirements of the particular safety application for which the safety circuit 1304 is designed.

In some embodiments, comms master device 208 can be configured to direct its Global E-stop signal 1308 to a selected subset of comms master devices 208 that are connected to the network 1302. For example, in an architecture in which multiple comms master devices 208 are networked together, each comms master device 208 may be assigned a unique network address. Accordingly, a comms master device 208 that supports issuance of a global e-stop can be configured to send its Global E-stop signal 1308 only to a specified subset of comms master device addresses, which can be preconfigured by the system designer. This functionality may be useful for architectures in which some monitored production areas are permitted to continue operating even in the event of a global e-stop.

After initiation of a global e-stop event, comms master device 208a can continue to monitor for presence of the pulsed safety signal 206a on its SWS+ INPUT terminal. When the safety function of the safety device 204ac has been re-validated (e.g., by pulling the e-stop pushbutton back to its original state), and if all other safety devices 204 on the safety circuit are in their safe states (safety functions are validated), the safety signal 206a will be permitted to transmit back to the comms master device 208. In response to detecting the safety signal 206a on its SWS+ INPUT terminal, the comms master device 208a will communicate to the other comms master devices on the network 1302 that the global e-stop condition is no longer in effect. In various embodiments, the comms master device 208a can convey that the global e-stop is no longer in effect by ceasing to transmit the Global E-stop signal 1308, or by setting the value of its Global E-stop register to FALSE. In response to detecting that the global e-stop condition is no longer in effect, the other comms master devices on the network 1302 (e.g., comms master 208b) can reset their safety contactors 606 and thereby reconnect power to their associated industrial assets.

Figure 14A:
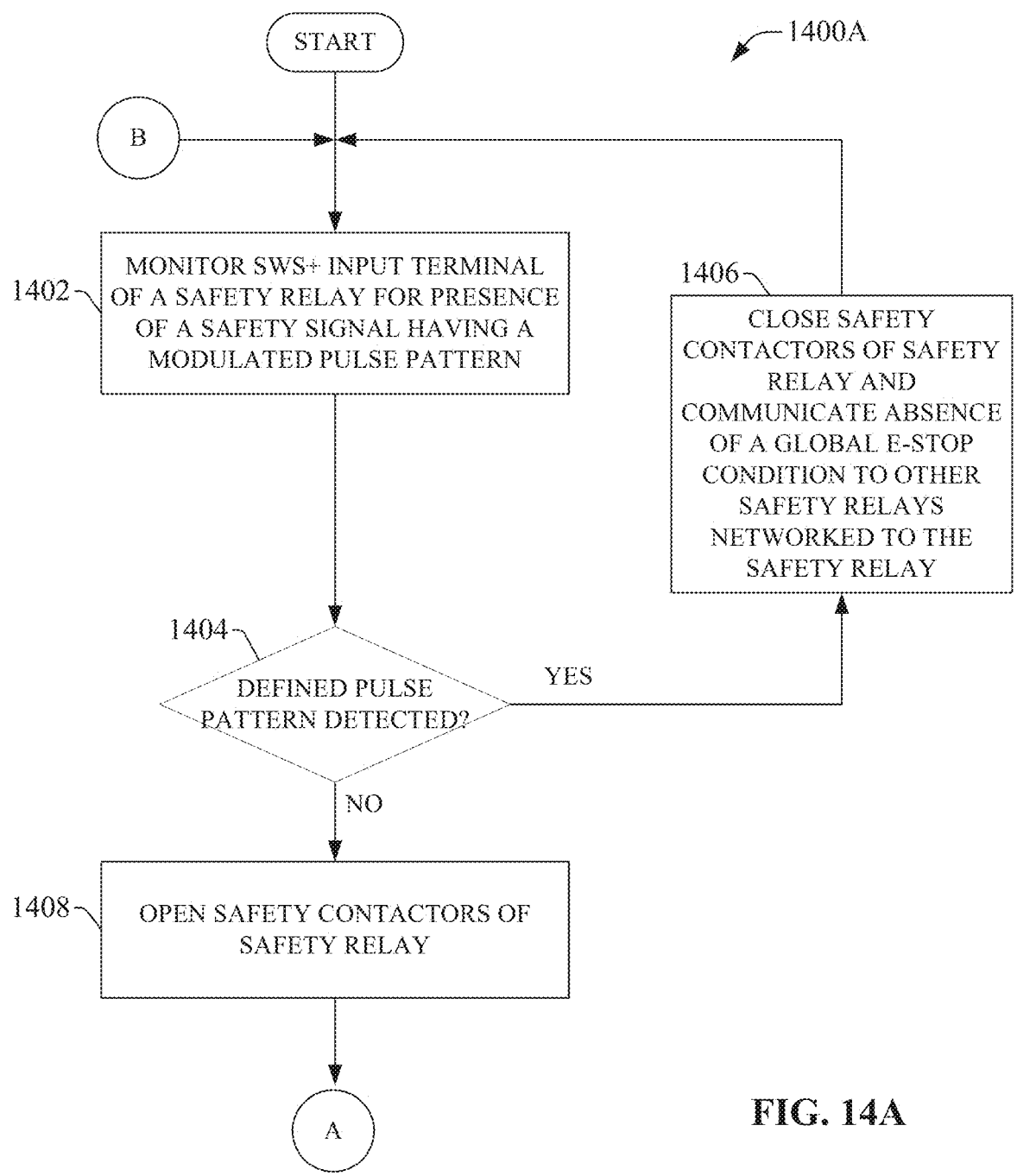
FIG. 14A is a flowchart of a first part of an example methodology for monitoring safety devices of a single-wire safety circuit and controlling the safety contactors of one or more safety relays based on the monitoring.
Figure 14B:
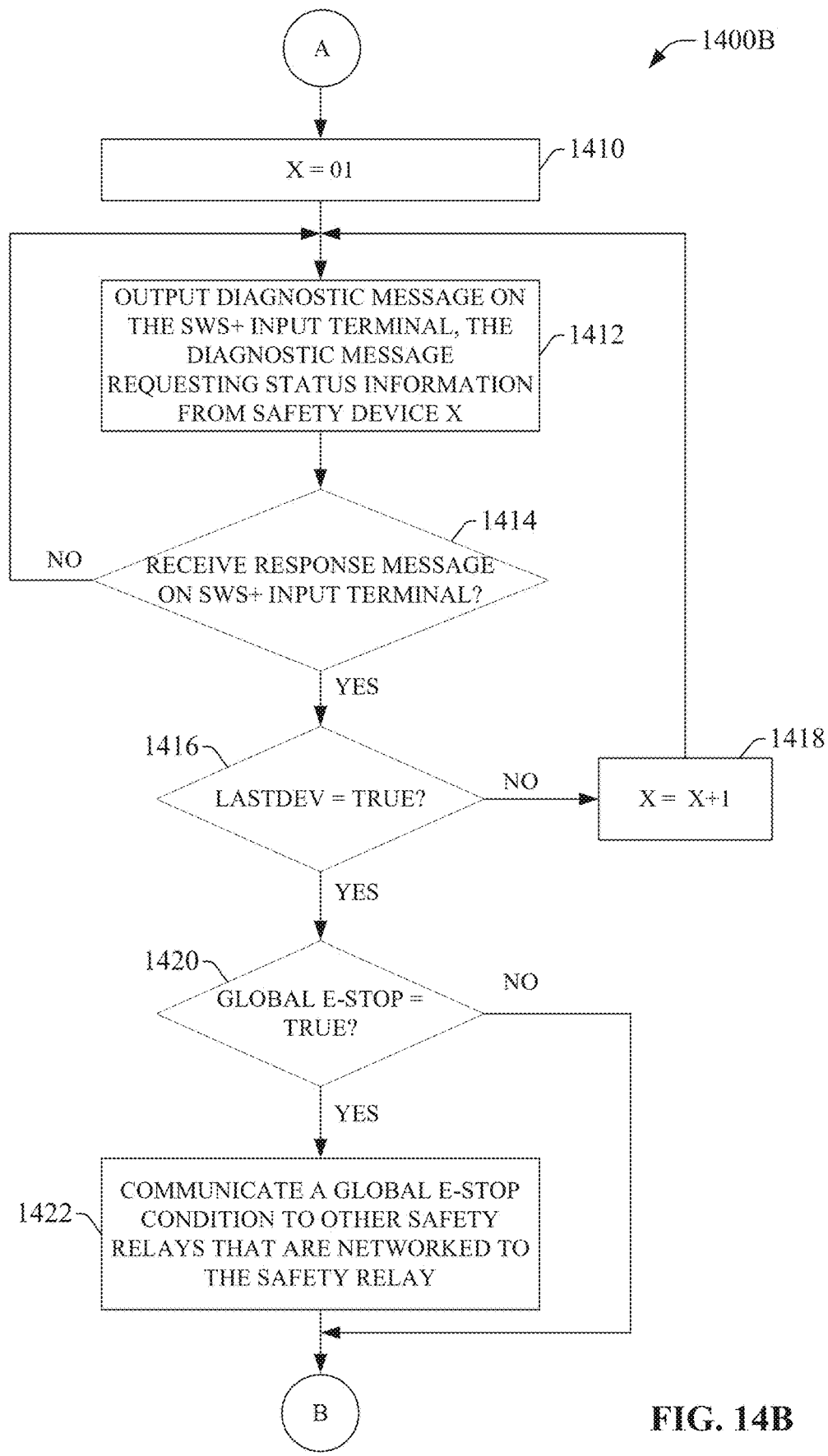
FIG. 14B is a flowchart of a second part of the example methodology for monitoring safety devices of a single-wire safety circuit and controlling the safety contactors of one or more safety relays based on the monitoring.

FIGS. 14A-14B illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 14A illustrates a first part of an example methodology 1400A for monitoring safety devices of a single-wire safety circuit and controlling the safety contactors of one or more safety relays based on the monitoring. Initially, at 1402, an SWS+ INPUT terminal of a safety relay compatible with a single-wire safety (SWS+) protocol is monitored for presence of a safety signal having a modulated pulse pattern. The safety relay may be, for example, a comms master device as described in foregoing examples. At 1404, a determination is made as to whether the pulse pattern detected on the safety signal matches a defined pulse pattern. This can be determined, for example, by comparing the detected pulse pattern with stored pulse pattern definition data that defines the expected pulse pattern. If the pulse pattern matches the defined pulse pattern (YES at step 1404), the methodology proceeds to step 1406, where the safety contactors of the safety relay are closed (or remain closed), the safety relay communicates absence of a global e-stop condition to other safety relays networked to the safety relay, and the monitoring continues at step 1402. Alternatively, if the detected pulse pattern does not match the defined pulse pattern (NO at step 1404), the methodology proceeds to step 1408, where the safety contactors of the safety relay are opened, thereby disconnecting power to hazardous industrial equipment being monitored by the safety circuit.

The methodology then proceeds to the second part 1400B illustrated in FIG. 14B. At 1410, a variable X representing an address of a safety device on the safety circuit being monitored by the safety relay is set to 01. At 1412, a diagnostic message (e.g., the DIAG message described in connection with FIGS. 9A-9D and 13A-13E) is output on the SWS+ INPUT terminal of the safety relay, the diagnostic message requesting status information from the safety device corresponding to address X. At 1414, a determination is made as to whether a response message is received on the SWS+ INPUT terminal within a defined time period subsequent to outputting the diagnostic message. If no response message is received within a defined period (NO at step 1414), the methodology returns to step 1412 and the diagnostic message is output again. Alternatively, if the response message is received (YES at step 1414), the methodology proceeds to step 1416, where a determination is made as to whether a LastDev indication contained in the response message is set to TRUE.

The LastDev indication indicates that the safety device corresponding to address X is the last device on the single-wire safety circuit capable of receiving the safety signal. If it is determined that the LastDev indication is FALSE (NO at step 1416), the methodology proceeds to step 1818, where X is incremented by one, and another diagnostic message directed to the next address is output at step 1412. Alternatively, if it is determined that LastDev=TRUE (YES at step 1416), indicating that safety device X is in its unsafe state (e.g., light curtain broken, emergency stop pushbutton engaged, object detected by laser scanner, etc.), the methodology proceeds to step 1420, where a determination is made as to whether a Global E-stop indication contained in the response message is set to TRUE. The Global E-stop indication informs the safety relay that safety device X has been configured as a global e-stop device rather than a local e-stop device. If the Global E-stop indication is determined to be set to TRUE (YES at step 1420), the methodology proceeds to step 1422, where the safety relay communicates a global e-stop condition to the other safety relays that are networked to the safety relay. The safety relay can communicate this global e-stop condition by setting a local Global E-stop variable that is monitored by all other safety relays on the network, or by broadcasting a Global E-stop signal to the other safety relays via the network. This global e-stop indication instructs the other safety relay devices on the network to open their safety contactors to thereby disconnect power to their associated industrial equipment. The methodology then returns to step 1402 of the first part 1400A, illustrated in FIG. 14A, and the safety relay's SWS+ input terminal continues to be monitored for reinstatement of the safety signal having the modulated pulse pattern.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 15:
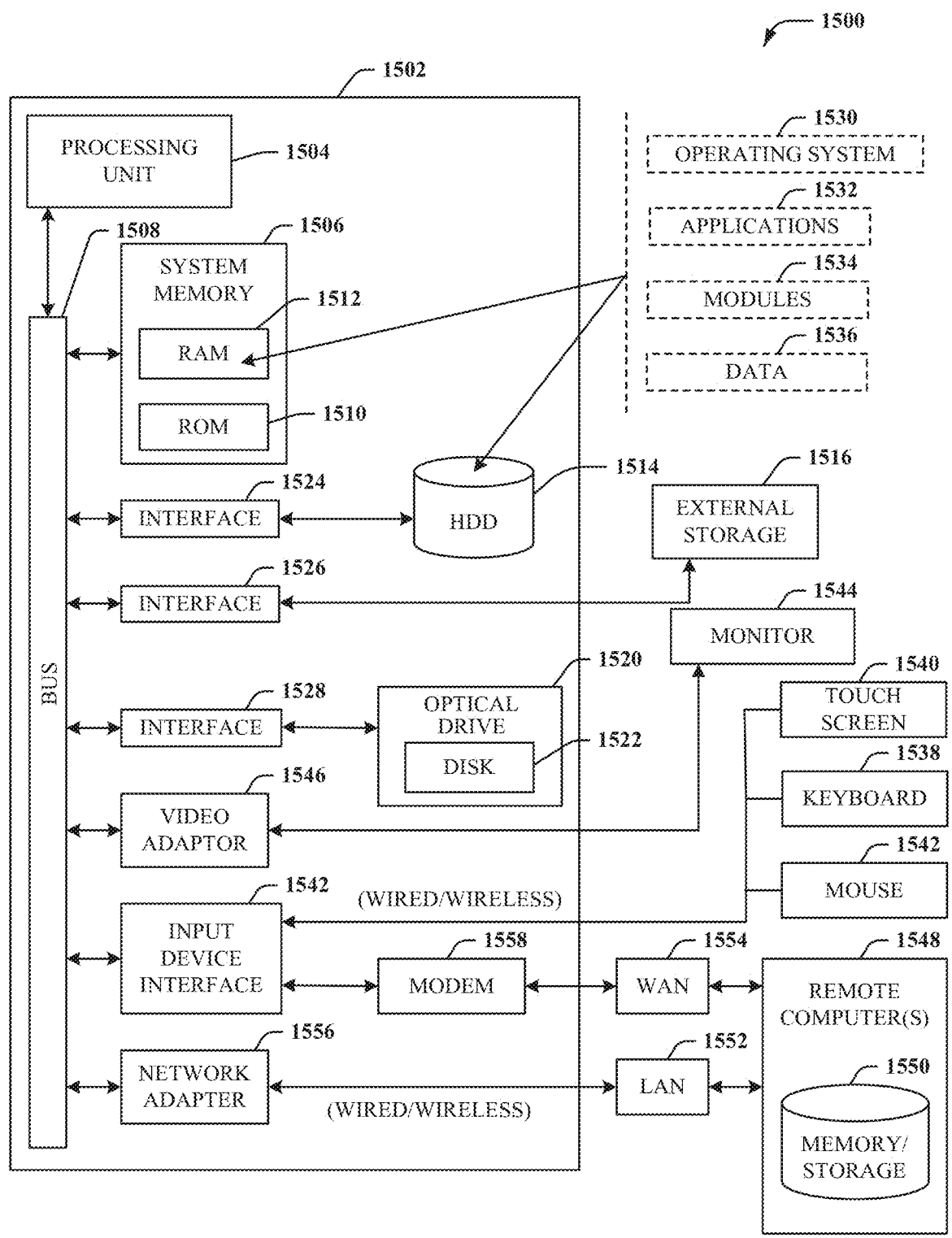
FIG. 15 is an example computing environment.
Figure 16:
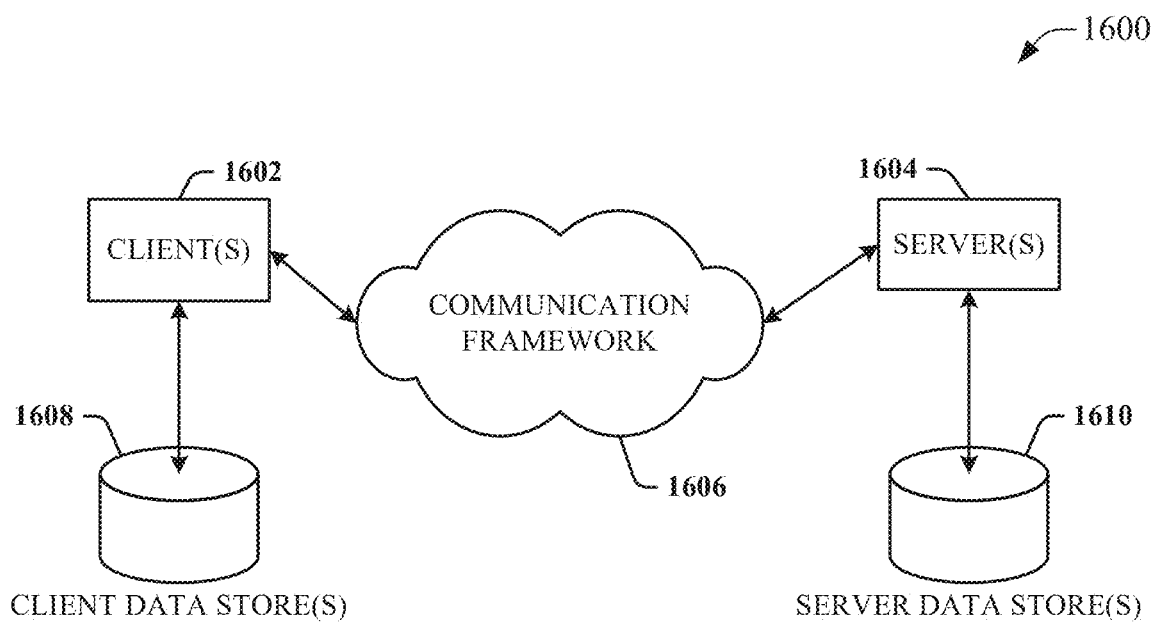
FIG. 16 is an example networking environment.

In order to provide a context for the various aspects of the disclosed subject matter, FIGS. 15 and 16 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15 the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for application programs 1532. Runtime environments are consistent execution environments that allow application programs 1532 to run on any operating system that includes the runtime environment. Similarly, operating system 1530 can support containers, and application programs 1532 can be in the form of containers, which are lightweight, standalone, executable packages of software that include, e.g., code, runtime, system tools, system libraries and settings for an application.

Further, computer 1502 can be enable with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1544 or other type of display device can be also connected to the system bus 1508 via an interface, such as a video adapter 1546. In addition to the monitor 1544, a computer typically includes other peripheral output devices (not shown), such as speakers, printers, etc.

The computer 1502 can operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1552 through a wired and/or wireless communication network interface or adapter 1556. The adapter 1556 can facilitate wired or wireless communication to the LAN 1552, which can also include a wireless access point (AP) disposed thereon for communicating with the adapter 1556 in a wireless mode.

When used in a WAN networking environment, the computer 1502 can include a modem 1558 or can be connected to a communications server on the WAN 1554 via other means for establishing communications over the WAN 1554, such as by way of the Internet. The modem 1558, which can be internal or external and a wired or wireless device, can be connected to the system bus 1508 via the input device interface 1542. In a networked environment, program modules depicted relative to the computer 1502 or portions thereof, can be stored in the remote memory/storage device 1550. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1552 or WAN 1554 e.g., by the adapter 1556 or modem 1558, respectively. Upon connecting the computer 1502 to an associated cloud storage system, the external storage interface 1526 can, with the aid of the adapter 1556 and/or modem 1558, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 16 is a schematic block diagram of a sample computing environment 1600 with which the disclosed subject matter can interact. The sample computing environment 1600 includes one or more client(s) 1602. The client(s) 1602 can be hardware and/or software (e.g., threads, processes, computing devices). The sample computing environment 1600 also includes one or more server(s) 1604. The server(s) 1604 can also be hardware and/or software (e.g., threads, processes, computing devices). The servers 1604 can house threads to perform transformations by employing one or more embodiments as described herein, for example. One possible communication between a client 1602 and servers 1604 can be in the form of a data packet adapted to be transmitted between two or more computer processes. The sample computing environment 1600 includes a communication framework 1606 that can be employed to facilitate communications between the client(s) 1602 and the server(s) 1604. The client(s) 1602 are operably connected to one or more client data store(s) 1608 that can be employed to store information local to the client(s) 1602. Similarly, the server(s) 1604 are operably connected to one or more server data store(s) 1610 that can be employed to store information local to the servers 1604.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A communications master device, comprising:
a processor, operatively coupled to a memory, that executes executable components stored on the memory, the executable components comprising:
a networking component configured to communicatively connect the communications master device to a network and exchange data with one or more other communications master devices over the network;
a pulse verification component configured to determine whether a pulse signal received via a single-wire safety channel conveys a defined pulse pattern;
a relay control component configured to place a safety contactor in a connected state while the defined pulse pattern is identified on the pulse signal, and to place the safety contactor in a disconnected state in response to detecting a loss of the defined pulse pattern on the pulse signal, wherein the loss of the defined pulse pattern is caused by a safety input device on the single-wire safety channel in response to loss of a safety function of the safety input device;
a message processing component configured to, in response to detecting the loss of the defined pulse pattern on the pulse signal, send a diagnostic message directed to the safety input device and receive a response message from the safety input device, wherein the response message indicates whether the safety input device is configured to act as a local emergency stop device that causes only the communications master device to disconnect power or a global emergency device that causes the communications master device and one or more other communications master devices to disconnect power; and
a global e-stop component configured to, in response to determining that the response message indicates that the safety input device is configured to act as a global emergency stop device, instruct the one or more other communications master devices to place their respective safety contactors in their disconnected states.

2. The communications master device of claim 1, wherein the global e-stop component is configured to instruct the one or more other communications master device to place their respective safety contactors in their disconnected states by at least one of setting a local register that is readable by the one or more other communications master devices via the network or to send an e-stop instruction message to the one or more other communications master devices via the network.

3. The communications master device of claim 1, wherein the safety input device is at least one of an emergency stop pushbutton, a light curtain device, a safety door switch, a safety mat device, an emergency pull-cord device, a laser scanner, or a photoelectric sensor.

4. The communications master device of claim 1, wherein the pulse verification component is configured to receive the pulse signal via a single-wire input terminal, and the message processing component is configured to send the diagnostic message via the single-wire input terminal.

5. The communications master device of claim 1, wherein the global e-stop component is further configured to, in response to receipt, via the network, of an emergency stop instruction from another communications master device of the one or more other communications master devices, place the safety contactor in the disconnected state.

6. The communications master device of claim 1, wherein
the single-wire safety channel comprises multiple safety input devices, including the safety input device, and
the pulse signal is generated by one of the safety input devices acting as a safety master device and transmitted through the multiple safety input devices via the single-wire safety channel.

7. The communications master device of claim 6, wherein the response message from the safety input device further comprises an indication of whether the safety input device is a last device, of the multiple safety input devices on the single-wire safety channel, capable of receiving the pulse signal.

8. The communications master device of claim 7, wherein
the safety input device is a first safety input device,
the response message is a first response message, and
the message processing component is configured to, in response to determining that the response message indicates that the safety input device is not the last device capable of receiving the pulse signal, increment a target device address for a subsequent diagnostic message and send the subsequent diagnostic message directed to another safety input device corresponding to the other target device address.

9. A method for operating an industrial safety system, comprising:
monitoring, by a communications master device of a single-wire safety circuit, a single-wire safety input terminal of the communications master device for presence of a pulse signal carrying a defined pulse pattern, wherein the single-wire safety circuit comprises the communications master and at least one safety input device;
in response to detecting, based on the monitoring, loss of the pulse signal caused by loss of a safety function of a safety input device, of the one or more safety input devices:

switching, by the communications master device, a safety contactor from a connected state to a disconnected state;

sending, by the communications master device via the single-wire safety input terminal, a diagnostic message directed to the safety input device; and receiving, by the communications master device, a response message from the safety input device indicating whether the safety input device is configured to act as a local emergency stop device that causes only the communications master device to disconnect power or a global emergency device that causes the communications master device and one or more other communications master devices networked to the communications master device to disconnect power; and in response to determining that the response message identifies the safety input device as being configured to act a global emergency stop device, instructing, by the communications master device, the one or more other communications master devices to transition their respective safety contactors to their disconnected states.

10. The method of claim 9, wherein the instructing comprises at least one of setting a value of a local register that is readable by the one or more other communications master devices via a network or sending an e-stop instruction message to the one or more other communications master devices via the network.

11. The method of claim 9, wherein the safety input device is at least one of an emergency stop pushbutton, a light curtain device, a safety door switch, a safety mat device, an emergency pull-cord device, a laser scanner, or a photoelectric sensor.

12. The method of claim 9, further comprising, in response to receipt of an emergency stop instruction from another communications master device of the one or more other communications master devices, transitioning the safety contactor to the disconnected state.

13. The method of claim 9, wherein
the single-wire safety circuit comprises multiple safety input devices, including the safety input device, and
the pulse signal is generated by one of the safety input devices acting as a c safety master device and transmitted through the multiple safety input devices via the single-wire safety circuit.

14. The method of claim 13, further comprising reading, by the communications master device, information included in the response message that identifies whether the safety input device is a last device, of the multiple safety input devices on the single-wire safety circuit, capable of receiving the pulse signal.

15. The method of claim 14, wherein
the safety input device is a first safety input device,
the response message is a first response message, and
the method further comprises:
in response to determining that the information identifies that the safety input device is not the last device capable of receiving the pulsed signal:
incrementing, by the communications master device, a target device address for a subsequent diagnostic message, and
sending, by the communications master device, the subsequent diagnostic message directed to another safety input device corresponding to the other target device address.

16. A non-transitory computer-readable medium having stored thereon instructions that, in response to execution, cause a communications master device comprising a processor to perform operations, the operations comprising:
monitoring a single-wire safety input terminal of the communications master device for presence of a pulse pattern carried on a safety signal, wherein the single-wire safety input terminal connects the communications master device to a single-wire safety circuit comprising at least one safety input device;
in response to detecting, based on the monitoring, loss of the pulse pattern:
opening a safety contactor of the communications master device;
sending, via the single-wire safety input terminal, a diagnostic message directed to a safety input device, of the at least one safety input device, on the single-wire safety circuit that is preventing the safety signal from proceeding to the single-wire safety input terminal; and
receiving, via the single-wire safety input terminal, a response message from the safety input device, wherein the response message indicates whether the safety input device is configured to act as a local emergency stop device that causes only the communications master device to disconnect power or a global emergency device that causes the communications master device and one or more other communications master devices networked to the communications master device to disconnect power; and
in response to determining that the response message identifies the safety input device as being configured to act as a global emergency stop device, sending an emergency stop signal that instructs the one or more other communications master devices to open their respective safety contactors.

17. The non-transitory computer-readable medium of claim 16, wherein the operations further comprise, in response to receipt of an emergency stop instruction from another communications master device of the one or more other communications master devices, opening the safety contactor.

18. The non-transitory computer-readable medium of claim 16, wherein the safety input device is at least one of an emergency stop pushbutton, a light curtain device, a safety door switch, a safety mat device, an emergency pull-cord device, a laser scanner, or a photoelectric sensor.

19. The non-transitory computer-readable medium of claim 16, wherein the operations further comprise:
reading, from the response message, information that identifies whether the safety input device is a last device, of multiple safety input devices on the single-wire safety circuit, capable of receiving the pulse signal;
in response to determining that the information indicates that the safety input device is not the last device capable of receiving the pulsed signal:
incrementing a target device address for a subsequent diagnostic message; and
sending the subsequent diagnostic message directed to another safety input device, of the multiple safety input devices, corresponding to the other target device address.

20. The non-transitory computer-readable medium of claim 16, wherein the sending of the emergency stop signal comprises at least one of setting a value of a local register that is readable by the one or more other communications master devices via a network or sending an e-stop instruction message to the one or more other communications master devices via the network.

* * * * *